United States Patent
Ma et al.

(10) Patent No.: US 9,727,514 B2
(45) Date of Patent: Aug. 8, 2017

(54) INTEGRATED CIRCUITS WITH UNIVERSAL SERIAL BUS 2.0 AND EMBEDDED UNIVERSAL SERIAL BUS 2 CONNECTIVITY

(71) Applicant: BROADCOM CORPORATION, Irvine, CA (US)

(72) Inventors: Desheng Ma, Irvine, CA (US); Derek Hing Sang Tam, Irvine, CA (US); Chia-Jen Hsu, Irvine, CA (US); Preeti Mulage, Mountain View, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 277 days.

(21) Appl. No.: 14/590,780

(22) Filed: Jan. 6, 2015

(65) Prior Publication Data
US 2016/0162430 A1 Jun. 9, 2016

Related U.S. Application Data

(60) Provisional application No. 62/089,749, filed on Dec. 9, 2014.

(51) Int. Cl.
*G06F 13/38* (2006.01)
*G06F 13/40* (2006.01)
(Continued)

(52) U.S. Cl.
CPC ........ *G06F 13/4059* (2013.01); *G06F 1/3287* (2013.01); *G06F 13/385* (2013.01);
(Continued)

(58) Field of Classification Search
CPC ................. G06F 13/385; G06F 13/387; G06F 2213/0042
See application file for complete search history.

(56) References Cited

U.S. PATENT DOCUMENTS

| 8,977,789 B2 * | 3/2015 | Chan ..................... G06F 13/385 710/32 |
| 2006/0080490 A1 | 4/2006 | Tang |

(Continued)

OTHER PUBLICATIONS

Embedded USB2 (eUSB2) Physical Layer Supplement to the USB Revision 2.0 Specification-Rev. 1.0, Hewlett-Packard Company, Intel Corporation, LSI Corporation, Microsoft Corporation, Renesas, and ST-Ericsson, 2013, pp. 1-105.
(Continued)

*Primary Examiner* — Glenn A Auve
(74) *Attorney, Agent, or Firm* — McDermott Will & Emery LLP

(57) ABSTRACT

An integrated circuit is provided. The integrated circuit includes a communication-mode determination circuitry configured to detect a signal level at one or both of a first data line and a second data line and to determine whether a communication mode of the first data line and the second data line is a first universal series bus (USB) communication mode or a second USB communication mode. The integrated circuit also includes a first transceiver circuitry configured to operate in one of multiple modes, based on the communication mode determined. The integrated circuit also includes a second transceiver circuitry configured to operate in one of multiple modes, based on the communication mode determined. A maximum signal level of the first USB communication mode is greater than a maximum signal level of the second USB communication mode.

20 Claims, 15 Drawing Sheets

(51) Int. Cl.
G06F 1/32 (2006.01)
G06F 13/42 (2006.01)

(52) U.S. Cl.
CPC .. G06F 13/4295 (2013.01); G06F 2213/0042 (2013.01); Y02B 60/1228 (2013.01); Y02B 60/1235 (2013.01)

(56) References Cited

U.S. PATENT DOCUMENTS

| | | |
|---|---|---|
| 2008/0126592 A1 | 5/2008 | Townsend |
| 2008/0195770 A1 | 8/2008 | Wang et al. |
| 2009/0037622 A1 | 2/2009 | Dheeresh et al. |
| 2009/0307380 A1* | 12/2009 | Lee ............... G06F 13/387 710/14 |
| 2010/0049880 A1 | 2/2010 | Santhanam et al. |
| 2010/0082846 A1 | 4/2010 | Kim et al. |
| 2013/0159559 A1 | 6/2013 | Hess |
| 2013/0304942 A1 | 11/2013 | Golembeski et al. |
| 2014/0006652 A1 | 1/2014 | Chen et al. |
| 2014/0006674 A1* | 1/2014 | Chan ............... G06F 13/4027 710/313 |
| 2014/0149609 A1* | 5/2014 | Chan ............... G06F 13/385 710/16 |
| 2015/0032909 A1 | 1/2015 | Remple et al. |
| 2015/0242358 A1 | 8/2015 | Chan et al. |
| 2016/0162427 A1 | 6/2016 | Kang et al. |
| 2016/0170472 A1 | 6/2016 | Cosaro |

OTHER PUBLICATIONS

Universal Serial Bus Specification—Rev. 2.0, Compaq Computer Corporation, Hewlett-Packard Company, Intel Corporation, Lucent Technologies, Inc., Microsoft Corporation, NEC Corporation, Koninklijke Philips Electronics N.V., Apr. 27, 2000, pp. i-622.

* cited by examiner

US 9,727,514 B2

INTEGRATED CIRCUITS WITH UNIVERSAL SERIAL BUS 2.0 AND EMBEDDED UNIVERSAL SERIAL BUS 2 CONNECTIVITY

CROSS-REFERENCE TO RELATED APPLICATIONS

The present application claims the benefit of U.S. Provisional Patent Application No. 62/089,749, entitled "Integrated Circuits with Universal Serial Bus 2.0 and Embedded Universal Serial Bus 2 Connectivity", filed on Dec. 9, 2014, which is hereby incorporated by reference in its entirety for all purposes.

TECHNICAL FIELD

The present description relates generally to communications and connectivity, and in particular to, for example, without limitation, Universal Serial Bus (USB) connectivity, including integrated circuits with USB 2.0 and embedded USB2 (eUSB2) connectivity.

BACKGROUND

USB is a standard for defining cables, connectors, and communications protocols for connection, communication, and supplying of power between devices. For example, USB has provided a standard for the connection of a computer with peripheral devices such as keyboards, printers, external disk drives, among others. Each connection between the computer and a peripheral device may be through a USB cable plugged into a USB port of the computer and a USB port of the peripheral device. In addition, USB can be used to connect two computing devices.

The description provided in the background section, including without limitation, any problems, features, solutions, or information, should not be assumed to be prior art merely because it is mentioned in or associated with the background section. The background section may include information that describes one or more aspects of the subject technology.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
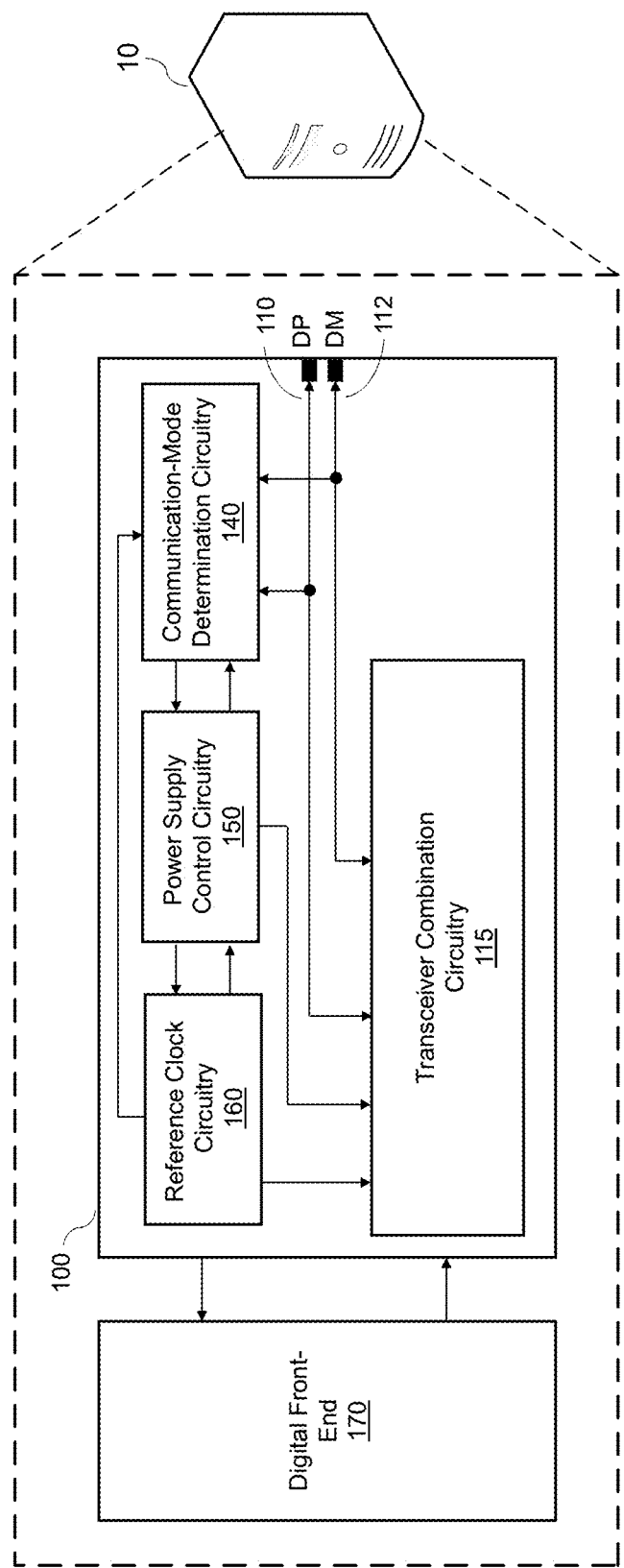
FIG. 1 illustrates an example of an integrated chip or portion thereof that facilitates communication via USB 2.0 and eUSB2 in accordance with one or more implementations of the subject disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more instances, structures and components are shown in block diagram form in order to avoid obscuring the concepts of the subject technology. One or more implementations of the subject disclosure are illustrated by and/or described in connection with one or more figures and are set forth in the claims.

The USB 2.0 standard supports short-cable communication between one device and another USB 2.0 compliant device. Short-cable communication may also be referred to as out of box communication. The eUSB2 standard supports inter-chip communication within a device and supports short-cable communication between the device and another USB 2.0 compliant device when utilized with one or more repeaters. A repeater may be utilized to translate between eUSB2 signaling and USB 2.0 signaling, or vice versa. Connections established through USB 2.0 and eUSB2 may allow for different data transfer modes including low speed (1.5 Mb/second), full speed (12 Mb/second), and high speed (480 Mb/second).

The subject disclosure provides a single integrated chip that facilitates communication via USB 2.0 and eUSB2. Such a single integrated chip may be referred to as a combination chip. In facilitating communication via USB 2.0 and eUSB2, in one or more implementations, the single integrated chip may allow support for both short cable and inter-chip applications without any external component. Implementation of USB 2.0 and eUSB2 on the single integrated chip may allow for a reduction in area cost and power overhead compared to separate integrated chips for USB 2.0 and eUSB2. For example, in the single integrated chip, a smaller area may be utilized for supporting the USB 2.0 and eUSB2 standards relative to utilization of one integrated chip for supporting USB 2.0 communication and another integrated chip for supporting eUSB2 communication. The single integrated chip may allow for switching between the USB 2.0 and eUSB2 communications based on a connecting component (e.g., a connecting chip or connecting device) that may be connected to the single integrated chip. A mode of operation of the single integrated chip may be identified by a communication mode (e.g., USB 2.0, eUSB2) and a speed mode (e.g., low speed, full speed, high speed). Although USB 2.0 communications are discussed herein, the single integrated chip may also be utilized with USB 1.x communications, such as for full speed mode and low speed mode.

FIG. 1 illustrates an example of a device 10 that includes an integrated chip or portion thereof, referred to hereafter as an integrated chip 100, that facilitates communication via USB 2.0 and eUSB2 in accordance with one or more implementations of the subject disclosure. The device 10 may include, by way of non-limiting example, a desktop computer, a laptop computer, a tablet computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices. A mode of operation of the device 10 may be identified by a communication mode (e.g., USB 2.0, eUSB2) and a speed mode (e.g., low speed, full speed, high speed).

The integrated chip 100 includes a first data line 110, a second data line 112, a transceiver combination circuitry 115, a communication-mode determination circuitry 140, a power supply control circuitry 150, and a reference clock circuitry 160. The power supply control circuitry 150 may supply positive supply voltages, including a digital core supply voltage VDDC, an analog supply voltage VDDL, and a high voltage supply VDDH, to the various components of the integrated chip 100. In one or more implementations, the power supply control circuitry 150 may supply VSSC, VSSL, and VSSH, which are the negative supply voltages or ground references (e.g., 0 V) for VDDC, VDDL, and VDDH, respectively. The reference clock circuitry 160 may allow time synchronization between the various components of the integrated chip 100. A mode of operation of the transceiver combination circuitry 115 may be identified by a communication mode (e.g., USB 2.0, eUSB2) and a speed mode (e.g., low speed, full speed, high speed). By way of non-limiting example, VDDC, VDDL, and VDDH may be set to values of 0.9 V, 1.8 V, and 3.3 V, respectively.

In one or more implementations, the integrated chip 100 may be intelligently switched between the eUSB2 and USB 2.0 standards by detecting a standard being utilized by a component (not shown) connected to the first data line 110 and/or the second data line 112. Such detection may be performed by the communication-mode determination circuitry 140. The communication-mode determination circuitry 140 may detect a voltage level on the first data line 110 and/or a voltage level on the second data line 112, as such voltage level(s) are provided by the connecting component. Based on the detected voltage level, the communication-mode determination circuitry 140 may determine that a connecting component is attempting to establish a USB 2.0 connection with the integrated chip 100 or is attempting to establish a eUSB2 connection with the integrated chip 100. Based on the determination, the communication-mode determination circuitry 140 may indicate a first communication mode (e.g., a USB 2.0 connection) or a second communication mode (e.g., a eUSB2 connection), and may generate a respective control signal for the first communication mode or the second communication mode.

In one or more implementations, the transceiver combination circuitry 115 may include components that are shared between various combinations of the eUSB2 and USB 2.0 standards (or connections) and the speed modes. The similarity in the electrical specifications (e.g., signaling scheme, voltage level) of the high speed mode between the USB 2.0 and eUSB2 communication modes may allow the USB 2.0 and eUSB2 communication modes to share the same supply voltage (e.g., the analog supply voltage VDDL).

In one or more implementations, the integrated chip 100 may be, or may include, an analog front-end (AFE) of a USB 2.0 and eUSB2 compliant device. The AFE may be in communication with a digital front-end (DFE) 170. In one or more implementations, the AFE and DFE 170 may be on the same integrated chip. Alternatively, the AFE and DFE 170 may be on different integrated chips.

Figure 2:
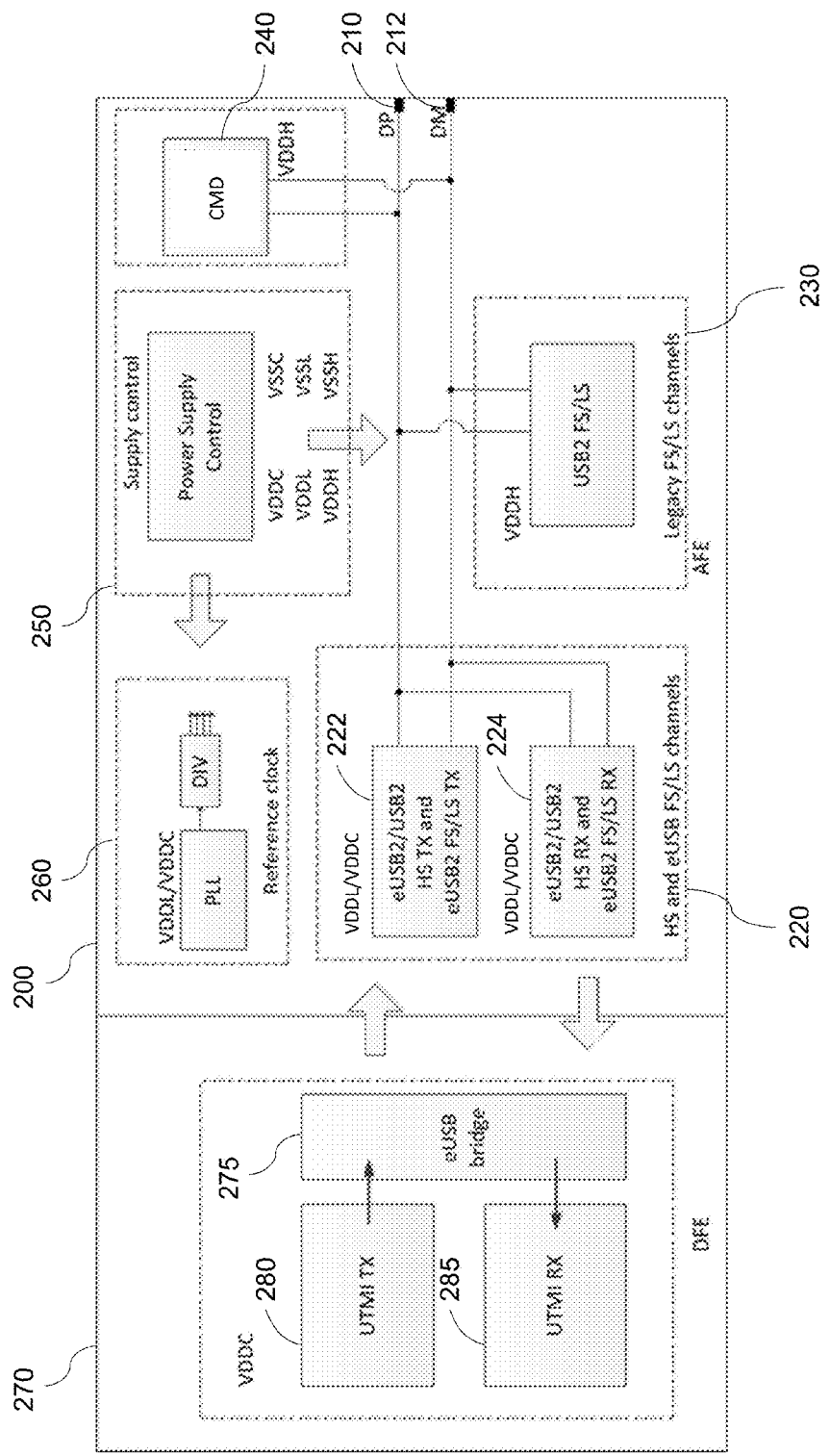
FIG. 2 illustrates an example of an integrated chip or portion thereof that facilitates communication via USB 2.0 and eUSB2 in accordance with one or more implementations of the subject disclosure.

FIG. 2 illustrates an example of an integrated chip or portion thereof, referred to hereafter as an integrated chip 200, that facilitates communication via USB 2.0 and eUSB2 in accordance with one or more implementations of the subject disclosure. In one or more implementations, the integrated chip 200 may be the integrated chip 100 of FIG. 1.

The integrated chip 200 includes a first data line 210, a second data line 212, a combination circuitry 220, a USB 2.0 full speed and low speed (FS/LS) circuitry 230, a communication-mode determination circuitry 240, a power supply control circuitry 250, and a reference clock circuitry 260. The power supply control circuitry 250 may supply the digital core supply voltage VDDC, analog supply voltage VDDL, and high voltage supply VDDH and their respective negative supply voltages or ground references VSSC, VSSL, and VSSH, to the various components of the integrated chip 200. The reference clock circuitry 260 may allow time synchronization between the various components of the integrated chip 200. A mode of operation of the integrated chip 200 or portion thereof (e.g., the combination circuitry 220, the USB 2.0 FS/LS circuitry 230) may be identified by a communication mode (e.g., USB 2.0, eUSB2) and a speed mode (e.g., low speed, full speed, high speed).

In one or more implementations, the integrated chip 200 may be intelligently switched between the eUSB2 and USB 2.0 standards by detecting a standard being utilized by a connecting component. Such detection may be performed by the communication-mode determination circuitry 240. The communication-mode determination circuitry 240 may detect a voltage level on the first data line 210 and/or a voltage level on the second data line 212. Based on the detected voltage level, the communication-mode determination circuitry 240 may determine that a connecting component is attempting to establish a USB 2.0 connection with the integrated chip 200 or is attempting to establish a eUSB2 connection with the integrated chip 200. Based on the determination, the communication-mode determination circuitry 240 may indicate a first communication mode (e.g., a USB 2.0 connection) or a second communication mode (e.g., a eUSB2 connection), and provide a corresponding control signal.

In one or more implementations, a control bit may be provided to the communication-mode determination circuitry 240 that indicates to the communication-mode determination circuitry 240 whether the connecting component is attempting to establish a USB 2.0 connection or a eUSB2 connection. In such implementations, the communication-mode determination circuitry 240 may forego detecting the voltage levels on the first data line 210 and the second data line 212. In such a case, the communication-mode determination circuitry 240 may make the communication mode determination based on the control bit (and may generate the corresponding control signal based on the control bit), rather than based on the voltage levels on the first data line 210 and the second data line 212.

The combination circuitry 220 may include a first combination transmitter circuitry 222 to transmit analog USB 2.0 signals and analog eUSB2 signals in high speed mode and transmit analog eUSB2 signals in full speed and low speed (FS/LS) mode. The first combination circuitry 220 may include a first combination receiver circuitry 224 to receive analog USB 2.0 signals and analog eUSB2 signals in HS mode and receive analog eUSB2 signals in FS/LS mode. The USB 2.0 FS/LS circuitry 230 may include a transmitter circuitry and a receiver circuitry to transmit and receive, respectively, analog USB 2.0 signals in full speed and low speed mode.

For high speed mode, USB 2.0 can utilize a nominal 400 mV differential signaling and eUSB2 can utilize a nominal 200 mV or 400 mV differential signaling. For full and low speed mode, USB 2.0 can utilize both differential and single-ended at 3.3 V signaling whereas eUSB2 can utilize single-ended signaling (e.g., single-ended CMOS signaling) at less than 1 V.

The similarity in the electrical specifications (e.g., signaling scheme, voltage level) of the high speed mode between the USB 2.0 and eUSB2 communication modes may allow the USB 2.0 and eUSB2 communication modes to share the same supply voltage (e.g., the analog supply voltage VDDL). In one or more implementations, operation of the combination circuitry 220 in the eUSB2 full speed or low speed mode may utilize the same supply voltage (e.g., the analog supply voltage VDDL) as operation of the combination circuitry 220 in the high speed mode of the USB 2.0 and eUSB2.

In one or more implementations, for transmission applications, the first combination transmitter circuitry 222 may generate different voltage levels for the different modes (e.g., different communication modes and/or speed modes) through adjusting reconfigurable circuitry. Reconfigurable circuitry may include, by way of non-limiting example, a reconfigurable current source (e.g., reconfigurable current source 430 in FIG. 4) and/or a reconfigurable resistor termination (e.g., reconfigurable resistor termination 435 in FIG. 4), which will be discussed later in the present disclosure.

In one or more implementations, the integrated chip 200 may be, or may include, an AFE of a USB 2.0 and eUSB2 compliant device. The AFE may be in communication with a DFE 270. In one or more implementations, the AFE and DFE 270 may be on the same integrated chip. Alternatively, the AFE and DFE 270 may be on different integrated chips. The DFE 270 includes a eUSB bridge 275, a transmitter USB transceiver macrocell interface (UTMI) 280, and a receiver UTMI 285. The eUSB bridge 275 may facilitate communication between the AFE and one of the transmitter UTMI 280 and the receiver UTMI 285, based on whether eUSB2 or USB 2.0 signals are being transmitted from or received by the AFE. The transmitter UTMI 280 and the receiver UTMI 285 are communicably connected with a controller (not shown), such as a USB 2.0 controller.

Figure 3A:
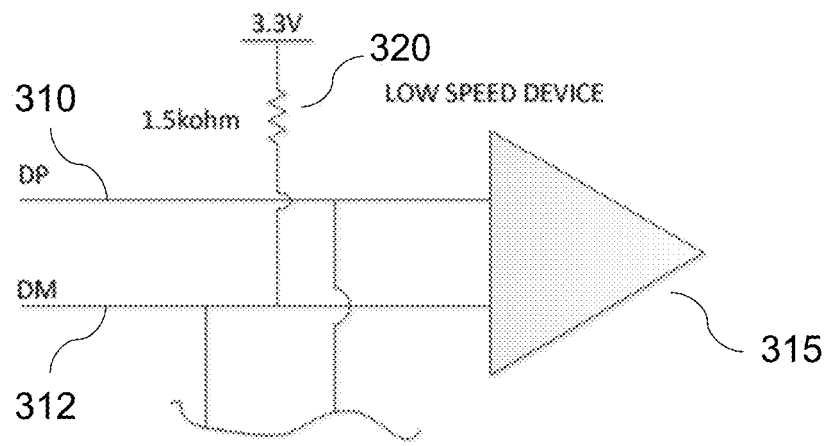
FIG. 3A illustrates a connecting component that may attempt to establish a USB 2.0 low speed mode connection.
Figure 3B:
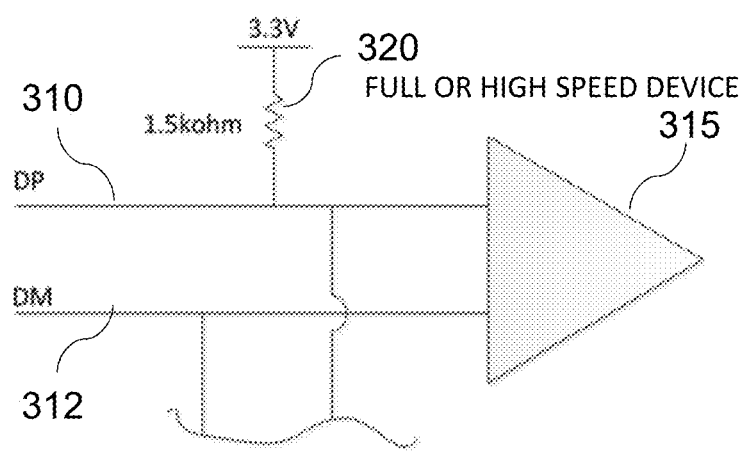
FIG. 3B illustrates a connecting component that may attempt to establish a high speed mode or a USB 2.0 full speed mode connection.

FIG. 3A illustrates a connecting component 315 that may attempt to establish a USB 2.0 low speed mode connection. FIG. 3B illustrates a connecting component 315 that may attempt to establish a USB 2.0 full speed mode or a USB 2.0 high speed mode connection.

In one or more implementations, with reference to FIG. 2, the first data line 210 is a DP data line and the second data line 212 is a DM data line. The integrated chip 200 may include a third line and a fourth line, which are not shown. The third line may be a ground (GND) line to which the first data line 210 and the second data line 212 are referenced. The fourth line may be a $V_{BUS}$ line that carries a nominal voltage (e.g., a nominal 5 V supply). The connecting component 315 may have a corresponding DP data line 310 and a corresponding DM data line 312 that are coupled to the first data line 210 and the second data line 212, respectively, of the integrated chip 200 when the connecting component 315 is attempting to establish a connection with the integrated chip 200.

In one or more implementations, since signal levels of FS and LS are different for eUSB2 and USB 2.0 standards and an HS connecting component (e.g., an HS device) initially presents itself as an FS connecting component (e.g., an FS device), the communication-mode determination circuitry 240 may detect voltage levels on the first data line 210 and/or the second data line 212 when a connecting component is electrically connected and then automatically switch the integrated circuit 200 for operation in the desired communication mode (e.g., eUSB2 or USB 2.0). Thus, the communication-mode determination circuitry 240 may distinguish between eUSB2 and USB 2.0 based on the different voltage levels of the communication modes.

For the connecting component 315 attempting to establish a USB 2.0 connection, the voltage level on one of the DP data line 310 and the DM data line 312 of the connecting device 315 may be pulled up to a predetermined voltage supply, such as a 3.3 V supply derived from a $V_{BUS}$ line in the connecting component 315. For a connecting component attempting to establish a eUSB2 connection, the voltage levels on the first data line 210 and the second data line 212 of the integrated chip 200 are generally less than 1 V. For a case with no connecting component (e.g., no electrically connected device), the first data line 210 and the second data line 212 of the integrated chip 200 are generally less than a predetermined voltage (e.g., 0.4 V).

Based at least on the different voltage levels associated with the USB 2.0 and eUSB2 communication modes and taking into consideration the case of no connecting component, in one or more implementations, the communication-mode determination circuitry 240 may set threshold voltages for distinguishing between USB 2.0, eUSB2, and the case of no connecting component. For example, the communication-mode determination circuitry 240 may, leaving some margin, set a threshold voltage for distinguishing between USB 2.0 and eUSB2 at some voltage value between a 1.1 V and 2.7 V. In this example, if 1.5 V is set as the threshold voltage, the communication-mode determination circuitry 240 may determine that a connecting component (e.g., a USB 2.0 device) is attempting to establish a USB 2.0 connection when one of the line voltages (e.g., the data line DP or the date line DM) is higher than 1.5 V.

With continued reference to the above example, the communication-mode determination circuitry 240 may set another threshold voltage for distinguishing between eUSB2 and the case of no connecting component. This threshold voltage may be set to 0.4 V for example. The communication-mode determination circuitry 240 may determine that a connecting component (e.g., another SOC on the same motherboard as the integrated circuit 200) is attempting to establish a eUSB2 connection when one of the line voltages is lower than 1.5 V and higher than 0.4 V. The communication-mode determination circuitry 240 may determine that no connecting component is electrically connected to the integrated chip 200 when the line voltages of the first data line 210 and the second data line 212 of the integrated chip 200 are less than 0.4 V.

In one or more implementations, operations of the DFE and other components of the AFE (e.g., components other than the communication-mode determination circuitry 240) may be placed on hold until the communication-mode determination circuitry 240 has determined the desired communication mode. Based on the communication mode determined by the communication-mode determination circuitry 240, the communication-mode determination circuitry 240 may provide a control signal that configures the integrated chip 200 for transmitting or receiving data via USB 2.0 or eUSB2.

The integrated circuit 200 may identify the connecting component 315 as being in low speed mode when a resistor 320 (e.g., a 1.5 kΩ pull-up resistor) in the DM data line 312 in the connecting component 315 is pulled up to the predetermined voltage supply, as illustrated in FIG. 3A. The integrated circuit 200 may identify the connecting component 315 as being in high speed or full speed mode when the resistor 320 in the DP data line 310 in the connecting component 315 is pulled up to the predetermined voltage supply, as illustrated in FIG. 3B. When the connecting component 315 is attempting to establish a high speed mode connection, the connecting component may start by connecting as a full speed connecting component. Once the connection is established, the connecting component may perform a high speed chirp to establish a high speed connection if a host (e.g., the integrated chip 200) supports high speed mode. In one or more implementations, an FS/LS circuitry (e.g., an FS/LS receiver circuitry) of the integrated circuit 200 may determine the speed mode associated with each communication mode. For example, the USB 2.0 FS/LS circuitry 230 may determine the speed mode for USB 2.0 communication and the second combination circuitry 224 may determine the speed mode for eUSB2.

Figure 4:
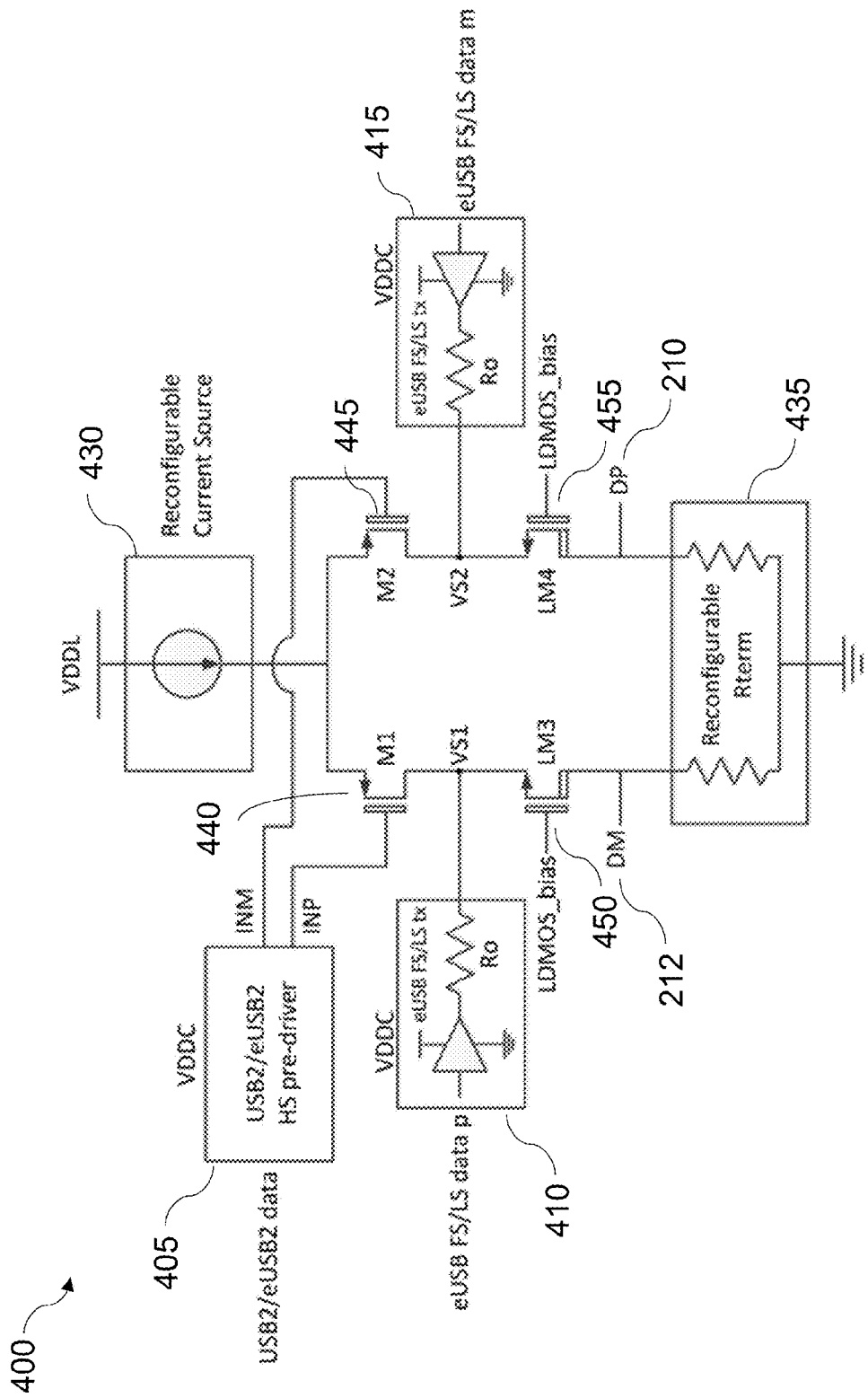
FIG. 4 illustrates an example of a transmitter driver for driving signals onto the first data line and the second data line of FIG. 2, in accordance with one or more implementations of the subject disclosure.

FIG. 4 illustrates an example of a transmitter driver 400 for driving signals onto the first data line 210 and the second data line 212 of FIG. 2, in accordance with one or more implementations of the subject disclosure. In one or more implementations, the transmitter driver 400 may be, or may be a part of, the first combination transmitter circuitry 222 of FIG. 2. In such implementations, the transmitter driver 400 may be in communication with the DFE 270 of FIG. 2.

The transmitter driver 400 includes a eUSB2/USB2.0 HS driver circuitry 405, a first eUSB2 FS/LS driver circuitry 410, a second eUSB2 FL/LS driver circuitry 415, a reconfigurable current source 430, a reconfigurable resistor termination 435, a first switch 440, a second switch 445, a first protection circuit 450, and a second protection circuit 455.

In one or more implementations, the first switch 440 and/or the second switch 445 may be switching transistors. The analog supply voltage VDDL is shared for the eUSB2/USB2.0 HS and eUSB2 FS/LS applications.

In one or more implementations, the reconfigurable resistor termination 435 is shared between the different modes (e.g., communication modes, speed modes) and may provide a different termination based on the mode that is currently operating (e.g., turned on). For example, the USB 2.0 standard specifies that USB 2.0 will utilize a single-ended 45Ω resistor termination to ground, and the eUSB2 standard specifies that eUSB2 HS TX will utilize a single-ended 40Ω source impedance and eUSB2.0 HS RX will utilize a differential 80Ω resistor termination with center-tapped capacitor. These modes that utilize termination are not turned on simultaneously, allowing for sharing of the reconfigurable resistor termination 435. Thus, depending on the mode, the reconfigurable resistor termination 435 may be adjusted to a desired termination according to the desired mode. The sharing of the reconfigurable resistor termination 435 between the different modes may allow for area reduction on the integrated chip 200 relative to providing separate terminations for the different modes.

The eUSB2/USB2.0 HS driver circuitry 405 utilizes differential signaling. Each of the first eUSB2 FS/LS driver circuitry 410 and the second eUSB2.0 FL/LS driver circuitry 415 utilizes single-ended signaling. The eUSB2/USB2.0 HS driver circuitry 405, first eUSB2 FS/LS driver circuitry 410, and second eUSB2 FL/LS driver circuitry 415 may be referred to as pre-drivers.

In one or more implementations, the transmitter driver 400 may be utilized for eUSB2/USB2.0 HS TX applications. In eUSB2/USB2.0 HS TX applications, the eUSB2 FS/LS TX, including the first eUSB2.0 FS/LS driver circuitry 410 and the second eUSB2 FL/LS driver circuitry 415, is turned off (e.g., effectively having a high impedance) such that operation of the eUSB2/USB2.0 HS TX application is generally unaffected by circuitry associated with eUSB2 FS/LS TX. The reconfigurable current source 430 may automatically adjust a current injected into the first switch 440 and the second switch 445. The current that is injected is dependent on whether USB2.0 HS or eUSB2 HS is utilized, due to the different electrical specifications for the USB 2.0 and eUSB2 standards.

In one or more implementations, the transmitter driver 400 may be utilized for eUSB2 FS/LS TX applications. In these applications, the first switch 440, the second switch 445, the reconfigurable current source 430, and the reconfigurable resistor termination 435 may be turned off. The INP and INM signals may be set to voltages that turn off the first switch 440 and the second switch 445. To turn off the first switch 440 and the second switch 445, the voltages may be pulled high when the first switch 440 and the second switch 445 are p-type metal-oxide-semiconductor (PMOS) transistors for example.

The first protection circuit 450 and the second protection circuit 455 may be utilized to prevent overvoltage. In FIG. 4, the eUSB2/USB2.0 HS TX application and the eUSB2 FS/LS TX application are implemented together in the transmitter driver 400 to share the first protection circuit 450 and the second protection circuit 455. In one or more implementations, the first protection circuit 450 and the second protection circuit 455 facilitate coexistence of eUSB2 and USB 2.0 on a single integrated circuit (e.g., the integrated chip 200 of FIG. 2). For instance, the first protection circuit 450 and the second protection circuit 455 facilitate coexistence of different electrical specifications. In one or more implementations, the same or similar protection mechanism may be utilized for eUSB2 and USB 2.0 RX applications.

Overvoltage may occur when a voltage in a circuit or a part of a circuit that includes is raised to a voltage level higher than an operating voltage limit of one or more components of the circuit. In one or more implementations, the overvoltage may be based on an operating voltage limit of a transistor. For example, in a 28 nm complementary MOS (CMOS) process, the operating voltage limit may be around 1 V+10% for core transistors and around 1.8 V+10% for input/output (I/O) transistors. Overvoltage may lead to breakdown of a transistor and cause reliability issues.

In one or more implementations, the first protection circuit 450 and/or the second protection circuit 455 may be laterally diffused MOS (LDMOS) transistors. The higher drain-to-source breakdown generally associated with LDMOS transistors may allow LDMOS transistors to provide protection. When a high voltage is applied to one of the first data line 210 or the second data line 212, a bias (e.g., a gate bias) applied to the first protection circuit 450 or the second protection circuit 455 may help cause voltages seen by the various circuitry in the transmitter driver 400 to be lower than a respective voltage limit of the various circuitry.

An on-resistance of the first protection circuit 450 and the second protection circuit 455 may be factored in as part of a source impedance of the first eUSB2 FS/LS driver circuitry 410 and the second eUSB2 FL/LS driver circuitry 415. A total output impedance is a sum of the on-resistance of the first protection circuit 450 and the second protection circuit 455 and an output impedance of the first eUSB2.0 FS/LS driver circuitry 410 and the second eUSB2.0 FL/LS driver circuitry 415.

In one or more implementations, control signals may be generated within the combination circuitry 220 of FIG. 2 and provided to the reconfigurable current source 430 (e.g., to adjust the current injected into the first switch 440 and the second switch 445) and/or the reconfigurable resistor termination 435 (e.g., to adjust the termination provided). Alternatively or in addition, the DFE may provide control signals to the reconfigurable current source 430 and/or the reconfigurable resistor termination 435.

When eUSB2 HS TX or USB 2.0 HS TX is active, the eUSB2/USB2.0 HS driver circuitry 405 may receive signals from the DFE (e.g., the DFE 270 of FIG. 2) and perform logical operations on the received signals to generate the analog signals INM and INP. The analog signals INM and INP may be utilized to drive the eUSB2 or USB 2.0 signals onto the data lines DP 210 and DM 212. The digital core supply voltage VDDC provides voltage to the eUSB2/USB2.0 HS driver circuitry 405.

When eUSB2 FS or LS TX is active, one of the first eUSB2 FS/LS driver circuitry 410 or the second eUSB2 FL/LS driver circuitry 415 may receive signals from the DFE and perform logical operations on the received signals to generate the analog signal $VS_1$ or $VS_2$. The analog signal $VS_1$ or $VS_2$ may be utilized to drive the eUSB2 FS or LS signal onto the first data line 210 or the second data line 212. The digital core supply voltage VDDC provides voltage to the first eUSB2 FS/LS driver circuitry 410 and the second eUSB2 FL/LS driver circuitry 415.

Figure 5:
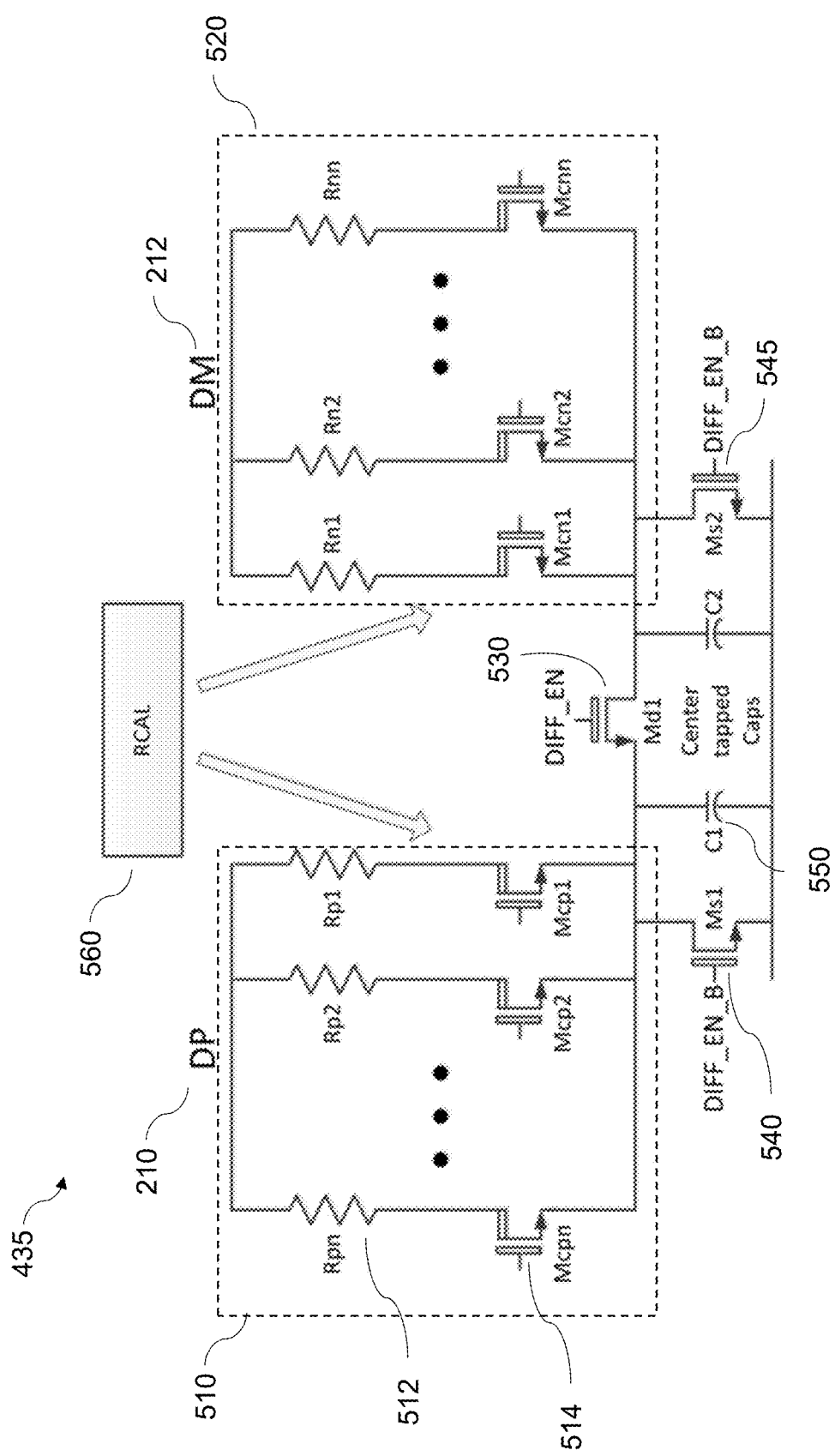
FIG. 5 illustrates an example of the reconfigurable resistor termination of FIG. 4, in accordance with one or more implementations of the subject disclosure.

FIG. 5 illustrates an example of the reconfigurable resistor termination 435 of FIG. 4, in accordance with one or more implementations of the subject disclosure. The reconfigurable resistor termination 435 is shared between different modes (e.g., USB 2.0, eUSB2 HS TX, eUSB2 HS RX) and may provide a different termination based on the mode that is currently operating. These modes that utilize termination are not turned on simultaneously, allowing for sharing of the reconfigurable resistor termination 435 between the different modes.

In one or more implementations, the reconfigurable resistor termination 435 includes a first resistor branch 510 that is coupled to the first data line 210 and a second resistor branch 520 that is coupled to the second data line 212. The first resistor branch 510 and the second resistor branch 520 include columns, where each column includes a resistor (e.g., a resistor $R_{pn}$ 512) in series with a switch (e.g., a switch $M_{cpn}$ 514). The resistance provided by the reconfigurable resistor termination 435 may be tuned by turning on or off the switches that are in series with their respective resistors. Resistance values of the resistors may be set such that the resistance values are binary weighted, piecewise linear, and so forth. The reconfigurable resistor termination 435 also includes capacitors (e.g., a center-tapped capacitor 550).

Although three resistors are shown in each of the first resistor branch 510 and the second resistor branch 520, fewer or more resistors may be utilized in the reconfigurable resistor termination 435. Other implementations of the reconfigurable resistor termination 435 in accordance with one or more implementations may be utilized such that the termination provided by the reconfigurable resistor termination 435 may be varied. For example, the reconfigurable resistor termination 435 may include a resistor in series with parallel resistor banks.

In one or more implementations, control bits (e.g., DIFF_EN, DIFF_EN_B) may be generated within the combination circuitry 220 of FIG. 2 and applied to the switches $M_{d1}$ 530, $M_{s1}$ 540, and $M_{s2}$ 545 in order to select differential or single-ended termination based on the communication mode and speed mode that is in operation. Alternatively or in addition, the DFE (e.g., the DFE 270 of FIG. 2) may provide control bits for the switches $M_{d1}$ 530, $M_{s1}$ 540, and $M_{s2}$ 545.

In one or more implementations, the switches (e.g., the switch $M_{cpn}$ 514) in the first resistor branch 510 and the second resistor branch 520 may be LDMOS transistors to facilitate the withstanding of high voltages that may be applied to the data lines DP 210 and/or DM 212. With protection from the LDMOS transistors, the switches $M_{d1}$ 530, $M_{s1}$ 540, and $M_{s2}$ 545, may be regular thick oxide n-type MOS (NMOS) transistors (e.g., to reduce area). In some aspects, DIFF_EN and DIFF_EN_B may be logic control bits in the analog supply voltage VDDL domain. When DIFF_EN is a logic '0', DIFF_EN_B is a logic '1' and the termination may be utilized for single-ended termination. When DIFF_EN is a logic '1', DIFF_EN_B is a logic '0' and the switches $M_{s1}$ 540 and $M_{s2}$ 545 are turned off. The termination in such a case is a differential termination with center-tapped capacitors (e.g., the center-tapped capacitor 550).

In one or more implementations, a resistor calibration circuitry 560 may be utilized to calibrate resistance in the first resistor branch 510 and the second resistor branch 520. For example, the resistor calibration circuitry 560 may calibrate resistance in the first resistor branch 510 and the second resistor branch 520 to 45Ω for USB 2.0 and 40Ω for eUSB2. The resistor calibration circuit 560 may also factor in the on-resistance of the switches (e.g., the switch $M_{cpn}$ 514) in the first resistor branch 510 and second resistor branch 520 when calibrating the resistance. In one or more implementations, control signals may be generated within the combination circuitry 220 and/or the DFE 270 of FIG. 2 and provided to the resistor calibration circuitry 560.

Figure 6:
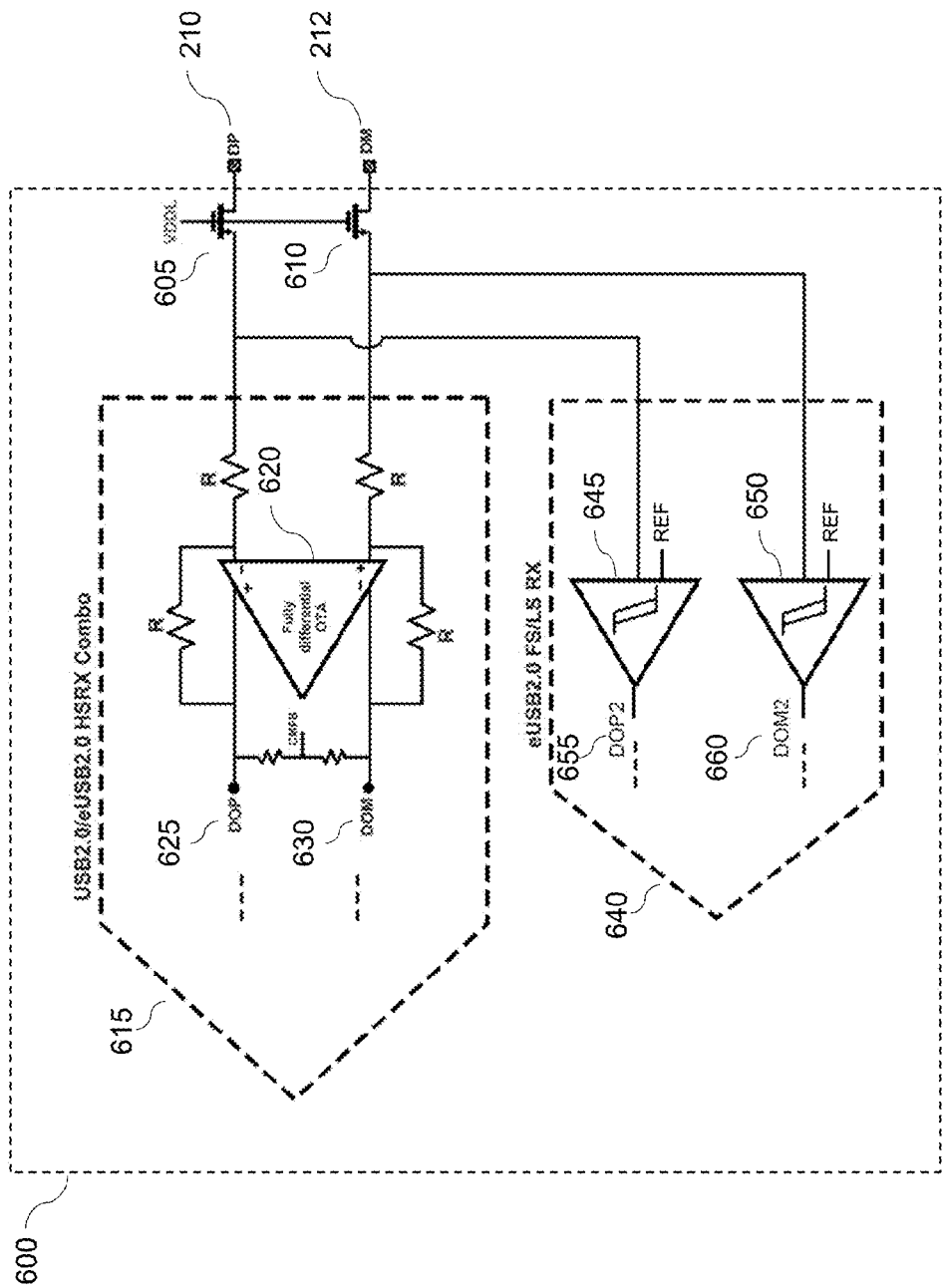
FIG. 6 shows an example of a combination receiver circuitry, in accordance with one or more implementations of the subject disclosure.

FIG. 6 shows an example of a combination receiver circuitry 600, in accordance with one or more implementations of the subject disclosure. The first combination receiver circuitry 224 of FIG. 2 may be, or may include, the combination receiver circuitry 600. The first combination receiver circuitry 600 includes a first protection circuitry 605, a second protection circuitry 610, a combination eUSB2/USB2.0 HS RX circuitry 615, and a eUSB2 FS/LS RX circuitry 640. The combination receiver circuitry 600 is coupled to the data lines DP 210 and DM 212.

The minimum differential voltage to be detected on the data lines DP 210 and DM 212 by a USB 2.0 RX is 200 mV whereas that for a eUSB2 RX is 120 mV. The first combination receiver circuitry 224 may include core transistors (not shown), which generally have better sensitivity and mismatch characteristics, for facilitating achievement of sensitivity for resolving smaller input signal swing and matching characteristics. The first protection circuitry 605 and the second protection circuitry 610 may be utilized to protect the core transistors from overvoltage related stress. For example, the USB 2.0 standard involves input voltage swings of around 2 V peak-to-peak, which would generally be higher than the overvoltage limit of core transistors.

In one or more implementations, the first protection circuitry 605 and/or the second protection circuitry 610 may be, or may include LDMOS transistors. Various nodes may be biased at intermediate voltages to protect core transistors, such as during power ramp-up conditions. Placement of the first protection circuitry 605 and the second protection circuitry 610 in front of the combination eUSB2/USB2.0 HS RX circuitry 615 may facilitate passing of the USB 2.0 AC stress test by the USB 2.0 RX, where a swing of up to 5 V may be applied across the data lines DP and DM.

In one or more implementations, the combination eUSB2/USB2.0 HS RX circuitry 615 may factor in common-mode (CM) rejection. For example, the HS RX may have a common-mode signal of up to 60 mV peak-to-peak between the frequencies of 50 MHz and 480 MHz. The combination eUSB2/USB2.0 HS RX circuitry 615 includes a fully-differential operational amplifier 620 with common-mode feedback. The fully-differential operational amplifier 620 with common-mode feedback may facilitate rejection of common-mode noise up to a bandwidth of 480 MHz. The fully-differential operational amplifier 620 is coupled to the first data line 210 and the second data line 212 through the first protection circuitry 605 and the second protection circuitry 610, respectively.

When eUSB2 HS RX or USB 2.0 HS RX is active, the combination eUSB2/USB2.0 HS RX circuitry 615 may receive analog signals from the first data line 210 and the second data line 212 and provide analog signals onto data lines DOP 625 and DOM 630. The data lines DOP 625 and DOM 630 may be coupled to other components (not shown) of the combination eUSB2/USB2.0 HS RX circuitry 615, and an output of the combination eUSB2/USB2.0 HS RX circuitry 615 may be provided to a DFE (e.g., the DFE 270 of FIG. 2) for processing.

In one or more implementations, the eUSB2 FS/LS RX circuitry 640 includes a first comparator 645 and a second comparator 650. The first comparator 645 is coupled to the data line DP 210 through the first protection circuitry 605. The second comparator 650 is coupled to the data line DP 212 through the second protection circuitry 610.

When eUSB2 FS or LS RX is active, the first comparator 645 may receive an analog signal on the data line DP 210 and provide an analog signal onto a data line DOP2 655 based on the analog signal on the data line DP 210 and a reference voltage (not shown). The second comparator 650 may receive an analog signal on the data line DP 212 and provide an analog signal onto a data line DOM2 660 based on the analog signal on the data line DP 210 and the reference voltage (not shown). The data lines DOP2 655 and DOM2 660 may be coupled to other components (not shown) of the eUSB2 FS/LS RX circuitry 640, and an output of the eUSB2 FS/LS RX circuitry 640 may be provided to the DFE for processing.

Figure 7:
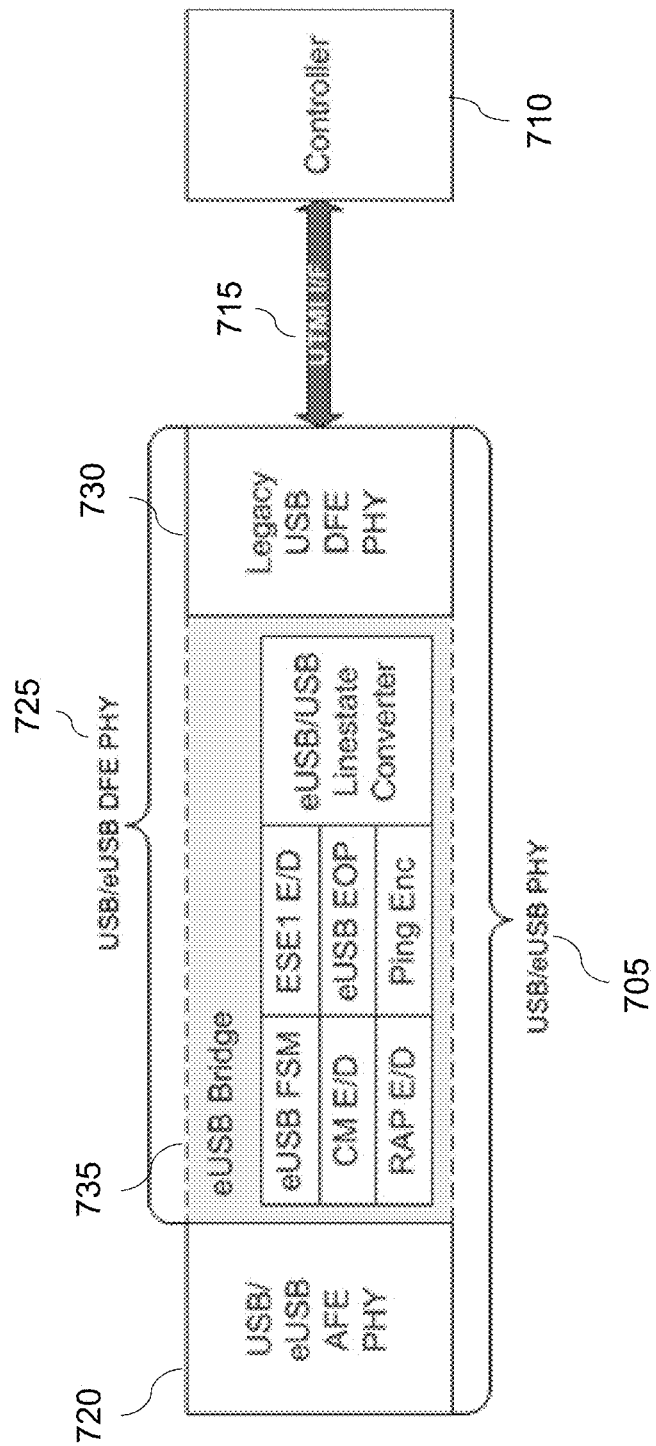
FIG. 7 illustrates a block diagram of a eUSB2/USB2.0 physical layer that may communicate with a USB 2.0 controller, in accordance with one or more implementations of the subject disclosure.

FIG. 7 illustrates a block diagram of a eUSB2/USB2.0 physical layer (PHY) 705 that may communicate with a USB 2.0 controller 710, in accordance with one or more implementations of the subject disclosure. In one or more implementations, the eUSB2/USB2.0 PHY 705 may communicate with the USB 2.0 controller 710 via a UTMI 715. The USB 2.0 controller 710 may direct traffic flow associated with USB 2.0 communication. The USB 2.0 controller 710 may be a host, device, or dual-role-device (DRD) controller.

The eUSB2/USB2.0 PHY 705 includes a eUSB2/USB2.0 AFE PHY 720 and a eUSB2/USB2.0 DFE PHY 725. The eUSB2/USB2.0 DFE PHY 725 includes a USB 2.0 DFE PHY 730 and a eUSB bridge 735. In one or more implementations, the eUSB2/USB2.0 AFE PHY 720 may be, or may include, components of the integrated chip 200 shown in FIG. 2. In one or more implementations, the eUSB2/USB2.0 DFE PHY 725 may be, or may include, components of the DFE 270 shown in FIG. 2. In one or more implementations, the eUSB2/USB2.0 AFE PHY 720 may be, or may include, the integrated chip 200 of FIG. 2. In one or more implementations, the eUSB2/USB2.0 DFE PHY 725 may include the eUSB bridge 275 of FIG. 2. In one or more implementations, the eUSB2/USB2.0 DFE PHY 725 may include the transmitter UTMI 280 and the receiver UTMI 285.

The eUSB bridge 735 includes a eUSB finite state machine (FSM), a control message encoder/decoder (CM E/D), a register access protocol encoder/decoder (RAP E/D), an extended single ended one encoder/decoder (ESE1 E/D), a eUSB end of packet (EOP), a ping encoder, and a eUSB/USB line state converter. The eUSB FSM may perform eUSB operations during power-up, connect, and resume. The CM E/D may encode and decode eUSB control messages such as reset, suspend, RAP start, or disconnect detect enable. The RAP E/D may control and configure registers in an associated repeater or eUSB peripheral port. The ESE1 E/D may encode and decode ESE1 signals for a port to announce an event of either disconnect or reconnect. The eUSB EOP may encode eUSB EOP from legacy USB EOP. The ping encoder may encode ping signals along with detecting eUSB EOP. The eUSB/USB linestart converter may convert eUSB line state to legacy USB line state. A line state may include such states as "Differential '1'", "Differential '0'", "Single Ended Zero" (SE0), "Start of Packet" (SOP), "End of Packet" (EOP), among others, where states may be based on values on the DP and DM data lines, transitions in the values on the DP and DM data lines, and so forth.

In one or more implementations, a logic implementation involved in facilitating utilization of eUSB2 and USB 2.0 may be optimized without changing a USB 2.0 UTMI interface logic, including logic provided by the USB 2.0 DFE PHY 730. The eUSB2 bridge 735 may provide an interface between the eUSB2/USB2.0 AFE PHY 720 and the USB 2.0 DFE PHY 730. A logic size of the eUSB2 bridge 735 may be less than 10% a logic size of the USB 2.0 DFE PHY 730. In such cases, a device that utilizes eUSB2 and USB 2.0 may include a single integrated chip with compatibility to eUSB2 and USB 2.0 without significantly increasing the logic size from a device with a standalone eUSB2 chip and/or a standalone USB 2.0 chip.

Figure 8A:
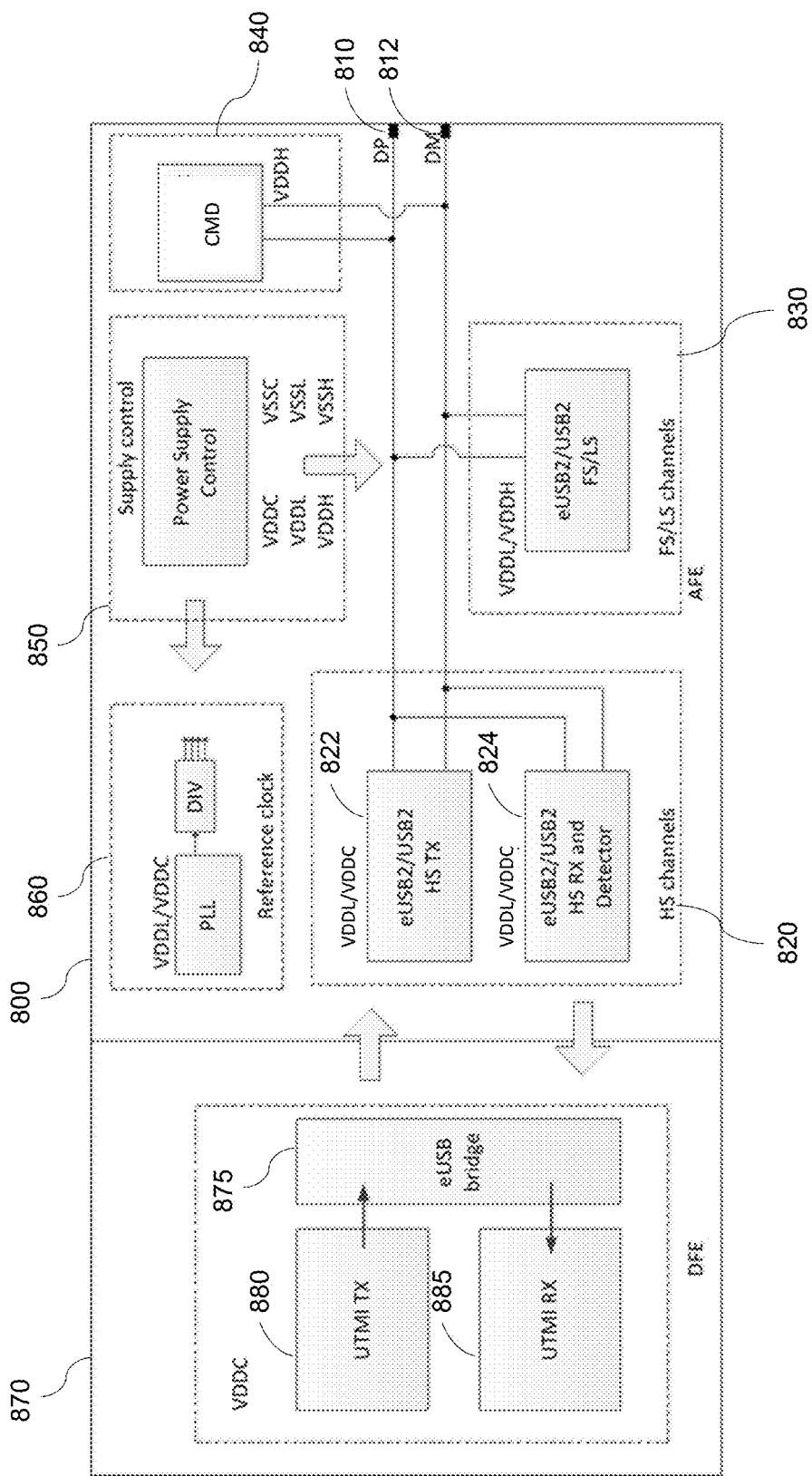
FIG. 8A illustrates an example of an integrated chip or portion thereof that facilitates communication via USB 2.0 and eUSB2 in accordance with one or more implementations of the subject disclosure.

FIG. 8A illustrates an example of an integrated chip or portion thereof, referred to hereafter as an integrated chip 800, that facilitates communication via USB 2.0 and eUSB2 in accordance with one or more implementations of the subject disclosure. In one or more implementations, the integrated chip 800 may be the integrated chip 100 of FIG. 1.

The integrated chip 800 includes a first data line 810, a second data line 812, an HS circuitry 820, an FS/LS circuitry 830, a communication-mode determination circuitry 840, a power supply control circuitry 850, and a reference clock circuitry 860. In one or more implementations, the various components in the integrated chip 800 may perform similar functions as those corresponding components in the integrated chip 200 of FIG. 2. A mode of operation of the integrated chip 800 or portion thereof (e.g., the HS circuitry 820, the FS/LS circuitry 830) may be identified by a communication mode (e.g., USB 2.0, eUSB2) and a speed mode (e.g., low speed, full speed, high speed).

The HS circuitry 820 may include an HS transmitter circuitry 822 to transmit USB 2.0 signals and eUSB2 signals in high speed mode and an HS receiver circuitry 824 to receive USB 2.0 signals and eUSB2 signals in high speed mode. In one or more implementations, for transmission applications, the HS transmitter circuitry 822 may generate different voltage levels for the different communication modes (e.g., eUSB2, USB 2.0) through adjusting reconfigurable circuitry, such as the reconfigurable current source 430 and/or the reconfigurable resistor termination 435 of FIG. 4.

The FS/LS circuitry 830 may be utilized to transmit or receive eUSB2 and USB 2.0 signals in full speed or low speed mode. The FS/LS circuitry 830 may be switched between utilizing the analog supply voltage VDDL or the high voltage supply VDDH based on the communication mode (e.g., eUSB2, USB 2.0). For eUSB2, the power supply control 850 may supply the analog supply voltage VDDL to the FS/LS circuitry 830. For USB 2.0, the power supply control 850 may supply the high voltage supply VDDH to the FS/LS circuitry 830. The high voltage supply VDDH may be shut down or connected to the analog supply VDDL to save power when the FS/LS circuitry 830 is operating in eUSB2. In one or more implementations, the FS/LS circuitry 830 may include voltage protection circuitry to provide protection from higher voltages associated with the USB 2.0 FS/LS.

For controlling the voltage supplied to the HS circuitry 820 and the FS/LS circuitry 830, in one or more implementations, the communication-mode determination circuitry 840 determines the communication mode and provides the determined communication mode to a DFE 870. The DFE 870 may then indicate to the power supply control 850 the determined communication mode, from which the power supply control 850 may determine which voltage supply (e.g., VDDH, VDDL) to utilize and what voltage to supply. Alternatively or in addition, the communication-mode determination circuitry 840 may provide the determined communication mode directly to the power supply control 850. In one or more implementations, the DFE 870 and/or the communication-mode determination circuitry 840 may provide instructions to the power supply control 850 regarding which voltage supply to utilize and what voltage to supply.

In one or more implementations, the integrated chip 800 may be, or may include, an AFE of a USB 2.0 and eUSB2 compliant device. The AFE may be in communication with the DFE 870. In one or more implementations, the AFE and the DFE 870 may be on the same integrated chip. Alternatively, the AFE and the DFE 870 may be on different integrated chips. The DFE 870 includes a eUSB bridge 875, a transmitter UTMI 880, and a receiver UTMI 885. The eUSB bridge 875 may facilitate communication between the AFE and one of the transmitter UTMI 880 and the receiver UTMI 885, based on whether eUSB2 or USB 2.0 signals are being transmitted from or received by the AFE. The transmitter UTMI 880 and the receiver UTMI 885 are communicably connected with a controller (not shown), such as a USB 2.0 controller.

Figure 8B:
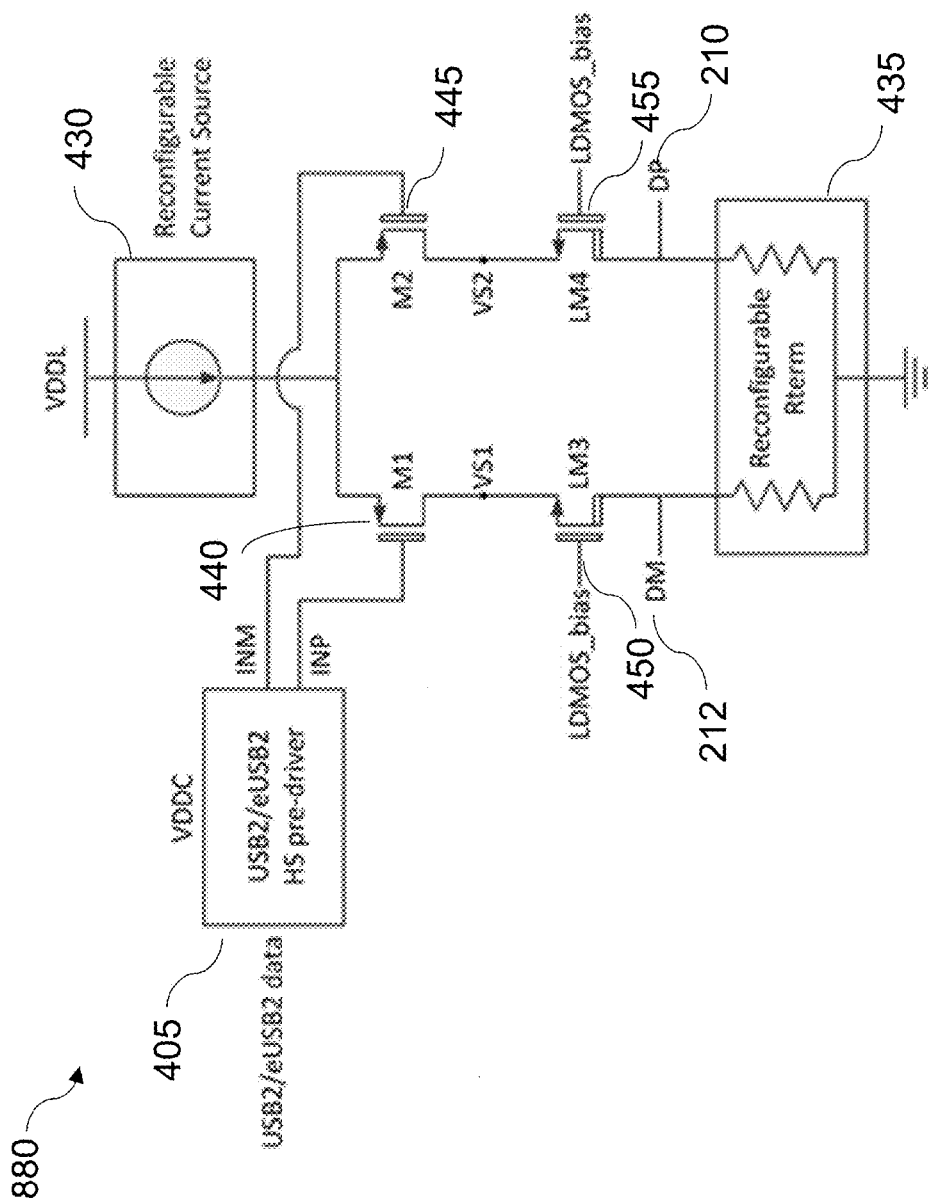
FIG. 8B illustrates an example of a transmitter driver for driving signals onto the first data line and the second data line of FIG. 8A, in accordance with one or more implementations of the subject disclosure.

FIG. 8B illustrates an example of a transmitter driver 880 for driving signals onto the first data line 810 and the second data line 812 of FIG. 8A, in accordance with one or more implementations of the subject disclosure. In one or more implementations, the transmitter driver 880 may be, or may be a part of, the HS transmitter circuitry 822 of FIG. 8A. In such implementations, the transmitter driver 880 may be in communication with the DFE 870 of FIG. 8A. The transmitter driver 880 includes the eUSB2/USB2.0 HS driver circuitry 405, the reconfigurable current source 430, the reconfigurable resistor termination 435, the first switch 440, the switch 445, the first protection circuit 450, and the second protection circuit 455. The transmitter driver 880 may operate similar to the transmitter driver 400 of FIG. 4, except that the transmitter driver 880 does not include driver circuitry associated with eUSB2 FS/LS (e.g., the first eUSB2 FS/LS driver circuitry 410 and the second eUSB2 FL/LS driver circuitry 415 of FIG. 4).

Figure 9:
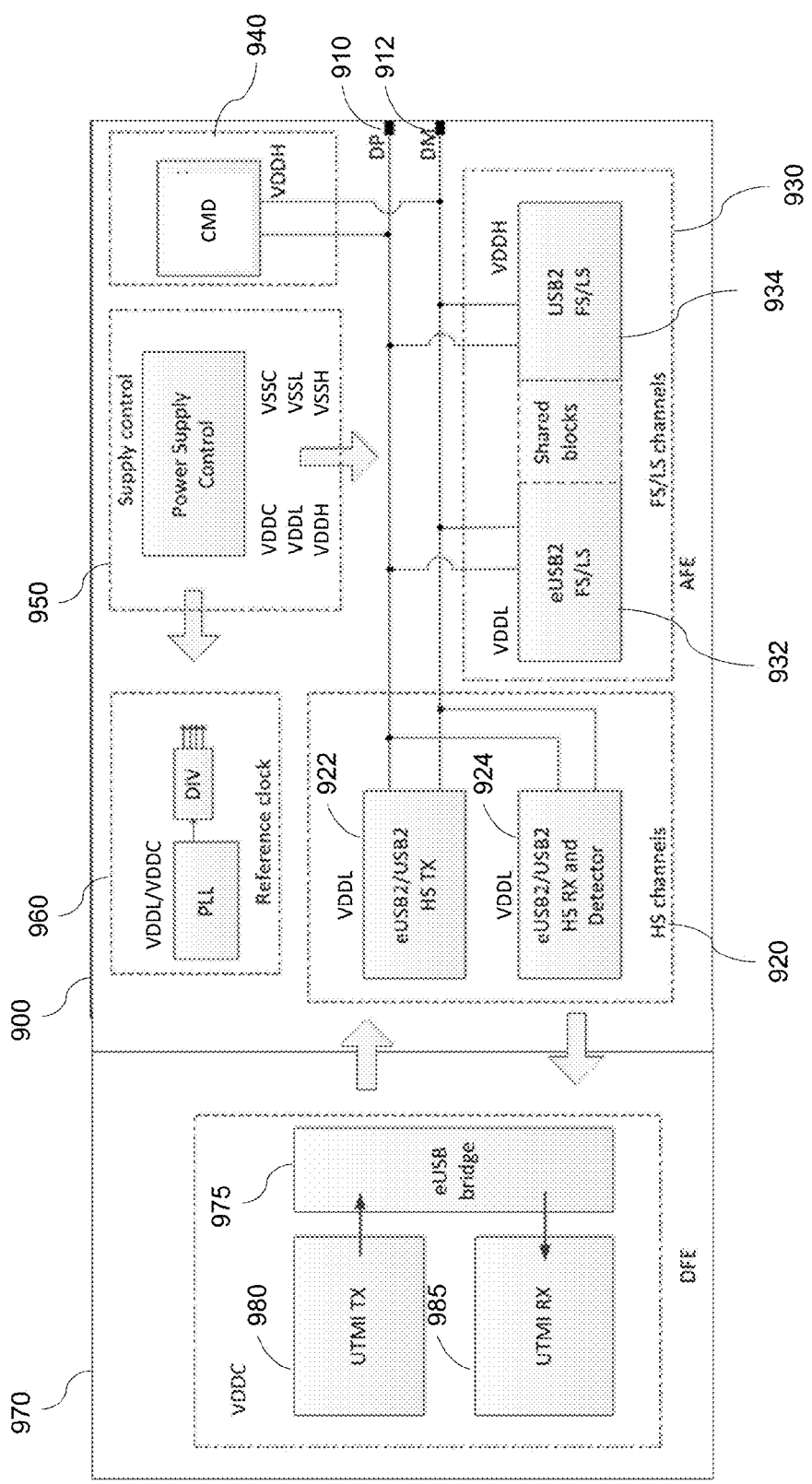
FIG. 9 illustrates an example of an integrated chip or portion thereof that facilitates communication via USB 2.0 and eUSB2 in accordance with one or more implementations of the subject disclosure.

FIG. 9 illustrates an example of an integrated chip or portion thereof, referred to hereafter as an integrated chip 900, that facilitates communication via USB 2.0 and eUSB2 in accordance with one or more implementations of the subject disclosure. In one or more implementations, the integrated chip 900 may be the integrated chip 100 of FIG. 1.

The integrated chip 900 includes a first data line 910, a second data line 912, a HS circuitry 920, an FS/LS circuitry 930, a communication-mode determination circuitry 940, a power supply control circuitry 950, and a reference clock circuitry 960. In one or more implementations, the various components in the integrated chip 900 may perform similar functions as those corresponding components in the integrated chip 200 of FIG. 2. A mode of operation of the integrated chip 900 or portion thereof (e.g., the HS circuitry 920, the FS/LS circuitry 930) may be identified by a communication mode (e.g., USB 2.0, eUSB2) and a speed mode (e.g., low speed, full speed, high speed).

The HS circuitry 920 may include an HS transmitter circuitry 922 to transmit USB 2.0 signals and eUSB2 signals in high speed mode and an HS receiver circuitry 924 to receive USB 2.0 signals and eUSB2 signals in high speed mode. The FS/LS circuitry 930 may include a eUSB2 FS/LS circuitry 932 and a USB 2.0 FS/LS circuitry 934 utilized to receive or transmit eUSB2 and USB 2.0 signals, respectively, in full speed or low speed mode.

In one or more implementations, the FS/LS circuitry 930 may include a voltage protection circuitry (not shown) that protects the eUSB2 FS/LS circuitry 932, which is associated with smaller voltage swings, from higher voltage swings associated with the USB 2.0 FS/LS circuitry 934. In one or more implementations, the USB 2.0 FS/LS circuitry 934 and the high voltage supply VDDH may be shut down (or disabled) to save power when the integrated circuit 900 is being utilized for receiving or transmitting data via eUSB2.

In one or more implementations, the integrated chip 900 may be, or may include, an AFE of a USB 2.0 and eUSB2 compliant device. The AFE may be in communication with a DFE 970. In one or more implementations, the AFE and the DFE 970 may be on the same integrated chip. Alternatively, the AFE and the DFE 970 may be on different integrated chips. The DFE 970 includes a eUSB bridge 975, a transmitter UTMI 980, and a receiver UTMI 985. The eUSB bridge 975 may facilitate communication between the AFE and one of the transmitter UTMI 980 and the receiver UTMI 985, based on whether eUSB2 or USB 2.0 signals are being transmitted from or received by the AFE. The transmitter UTMI 980 and the receiver UTMI 985 are communicably connected with a controller (not shown), such as a USB 2.0 controller.

Figure 10A:
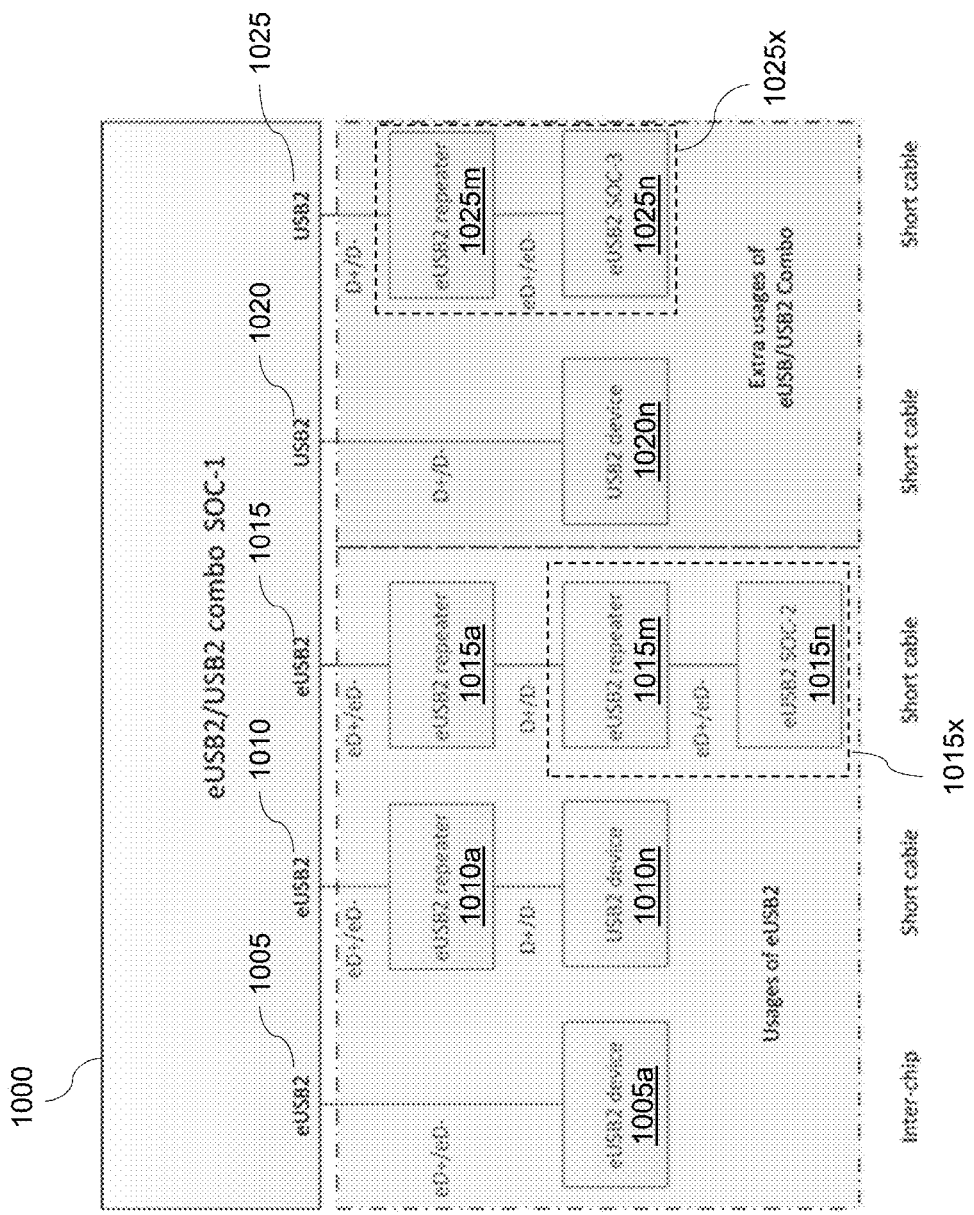
FIG. 10A illustrates example connections between ports of an integrated chip and a connecting component, in accordance with one or more implementations of the subject disclosure.

FIG. 10A illustrates example connections between ports of an integrated chip 1000 and a connecting component, in accordance with one or more implementations of the subject disclosure. FIGS. 10B through 10F illustrate examples of a connection with one of the ports of the integrated chip 1000 of FIG. 10A, in accordance with one or more implementations of the subject disclosure. For purposes of discussion, the integrated chip 1000 may be included in the device 10 of FIG. 1. The integrated chip 1000 may be the integrated chip 100 of FIG. 1. The integrated chip 1000 may be a system-on-chip (SOC). Although five separate ports are illustrated, fewer, different, or more separate ports may be utilized. For example, while FIG. 10A illustrates five separate ports 1005, 1010, 1015, 1020, and 1025, one port (instead of five physical ports) can be utilized for any of the functions illustrated for these five ports. In one or more implementations, each of the five separate ports can be switchable for use as a eUSB2 port or a USB 2.0 port. In FIG. 10A, D+/D− indicates USB 2.0 signaling and eD+/eD− indicates eUSB2 signaling.

Figure 10B:
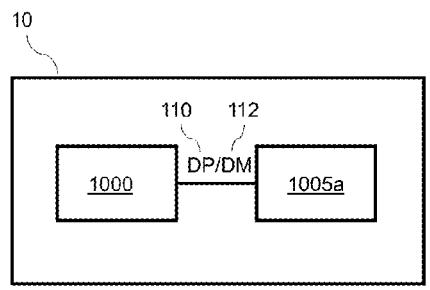
FIGS. 10B through 10F illustrate examples of a connection with one of the ports of the integrated chip of FIG. 10A, in accordance with one or more implementations of the subject disclosure.

In FIGS. 10A and 10B, a eUSB2 port 1005 of the device 10 may be utilized for inter-chip connection with another eUSB2 port of the device. For example, the device 10 (e.g., a computing device) may include a motherboard with the integrated chip 1000 and another chip (or SOC) 1005*a* with respective eUSB2 ports interconnected through eUSB2 inter-chip connection. The inter-chip connection may be a board trace for example.

Figure 10C:
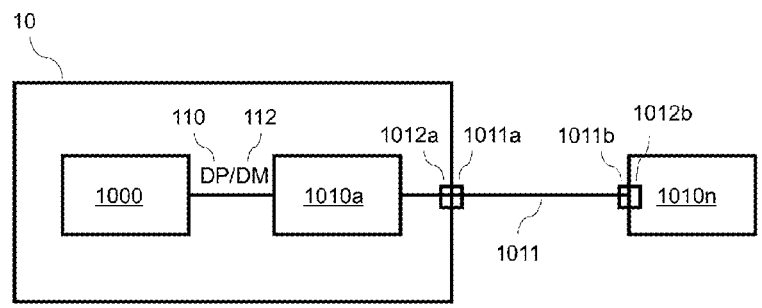

In FIGS. 10A and 10C, a eUSB2 port 1010 of the device 10 may be utilized for communication with a peripheral device 1010*n* (e.g., a mouse, flash memory) connected to the device 10 through a USB 2.0 port and a USB cable. A repeater 1010*a* may be utilized to translate between eUSB2 and USB 2.0 signaling.

Figure 10D:
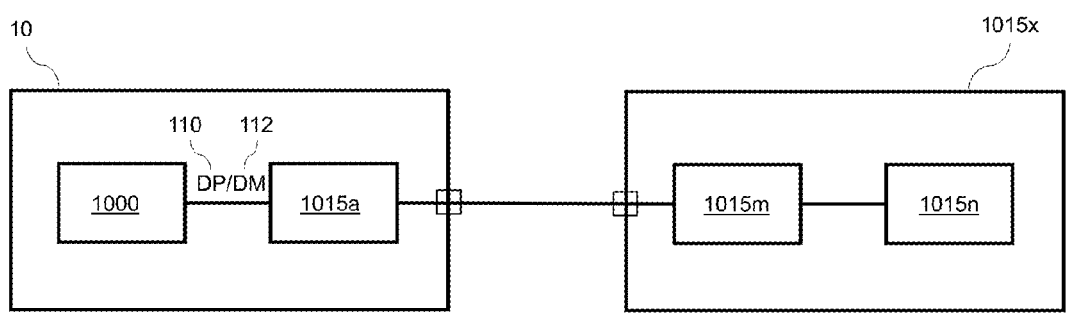

In FIGS. 10A and 10D, a eUSB2 port 1015 of the device 10 may be utilized for communication with a eUSB2 port of a second device 1015*x* (e.g., a tablet device). The second device 1015*x* may include a SOC 1015*n* with the eUSB2 port. The communication between the eUSB2 port 1015 and the eUSB2 port of the second device 1015*x* may be through the use of a first repeater 1015*a* in the device 10 and a second repeater 1015*m* in the second device 1015*x*. The first repeater 1015*a* and the second repeater 1015*m* may be connected to a USB 2.0 port of the respective devices. A USB cable may be utilized to connect the USB 2.0 port of the two devices.

Figure 10E:
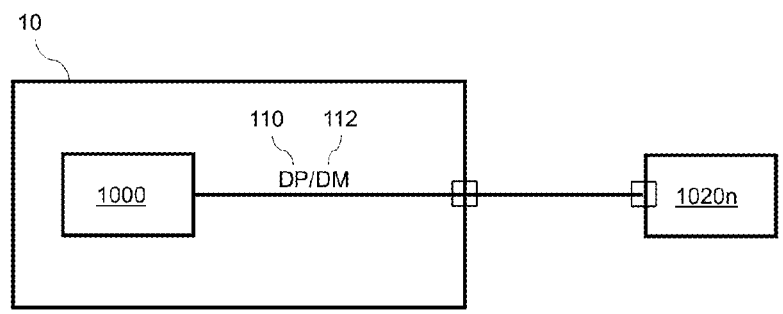
Figure 10F:
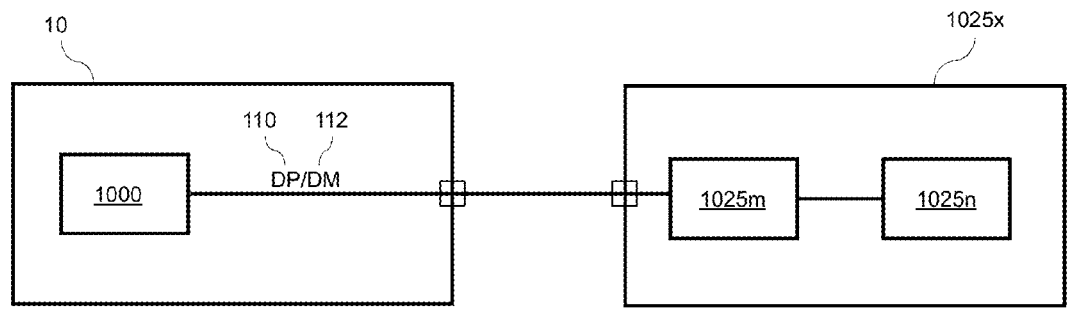

In FIGS. 10A and 10E, a USB 2.0 port 1020 of the device 10 may be utilized for communication with a second device 1020*n* (e.g., a peripheral device) through a USB cable. In FIGS. 10A and 10F, a USB 2.0 port 1025 of the device 10 may be utilized for communication with a eUSB2 compliant SOC chip 1025*n* of a second device 1025*x* through a repeater 1025*m* of the second device 1025*x*. The USB 2.0 port 1025 may connect with a USB 2.0 port of the second device 1025*x* through a USB cable, where the repeater 1025*m* is coupled to the USB 2.0 port of the second device 1025*x* and may translate USB 2.0 signaling to eUSB2 signaling for the eUSB2 compliant SOC chip 1025*n* of the second device 1025*x*.

Each of the devices 10, 1010*n*, 1015*n*, 1020*n*, 1025*n* in FIGS. 10A through 10F is a USB device. A USB device has a USB receptacle or a USB plug. A USB device may have a plurality of USB receptacles and/or USB plugs. A USB receptacle/plug can be, e.g., Type A, Mini-A, Micro-A, Type B, Mini-B, and Micro-B.

With reference to FIGS. 10A and 10C, each of the device 10 and the peripheral device 1010*n* is a USB device. The device 10 has a USB receptacle 1012*a* at an outer edge of the device 10. The device 1010*n* has a USB receptacle 1012*b* at an outer edge of the device 1010*n*. A USB cable 1011 includes a USB plug 1011*a* at one end and another USB plug 1011*b* at the other end. The USB plug 1011*a* is plugged into the USB receptacle 1012*a*. The USB plug 1012*b* is plugged into the USB receptacle 1012*b*. Hence, in this example, each of the two USB devices 10 and 1010*n* has a USB receptacle, and the two USB devices 10 and 1010*n* are connected using a USB cable 1011. In another example, a USB device may have a USB plug (e.g., a flash memory). Such a USB device may be plugged into a USB device with a USB receptacle directly without a USB cable.

Figure 11A:
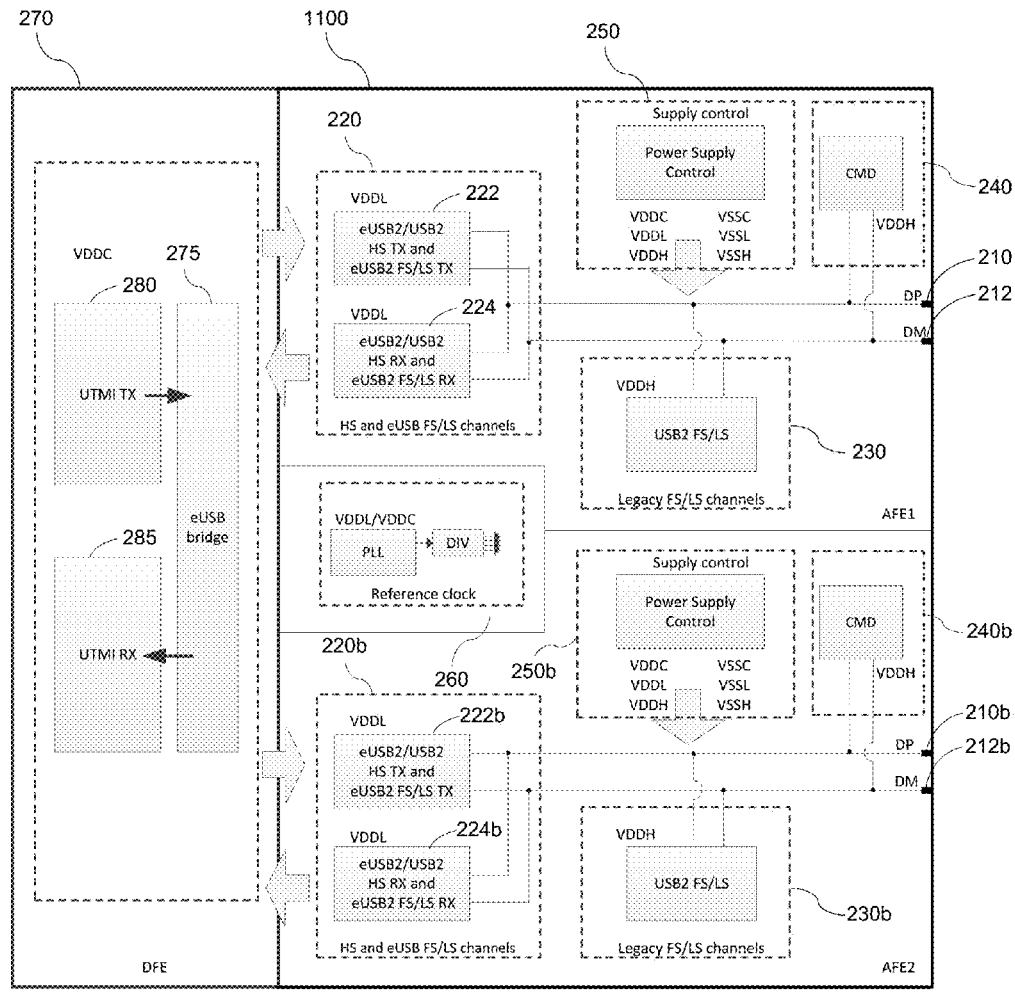
FIGS. 11A and 11B illustrate examples of an integrated chip or portion thereof that includes multiple ports, where each port facilitates communication via USB 2.0 and eUSB2, in accordance with one or more implementations of the subject disclosure.

FIG. 11A illustrates an example of an integrated chip or portion thereof, hereafter referred to as an integrated chip 1100, that includes multiple ports, where each port facilitates communication via USB 2.0 and eUSB2, in accordance with one or more implementations of the subject disclosure. With multi-port configurations operating in parallel, multiple eUSB2 communication, multiple USB 2.0 communication, and/or a combination of eUSB2 communication and USB 2.0 communication may operate simultaneously on the integrated chip 1100.

In one or more implementations, a first port of the integrated chip 1100 may be associated with the components illustrated in the integrated chip 200 of FIG. 2. A second port may be associated with components corresponding to those of the first port of the integrated chip 1100, including a first data line 210*b*, a second data line 212*b*, a combination circuitry 220*b*, a USB 2.0 FS/LS circuitry 230*b*, a communication-mode determination circuitry 240*b*, and a power supply control circuitry 250*b*. The reference clock circuitry 260 may be shared between the first port and the second port.

In one or more implementations, each of the ports of the integrated chip 1100 may be associated with a respective AFE of a USB 2.0 and eUSB2 compliant device. The AFEs may be in communication with a DFE 270, with the DFE 270 shared by the AFEs. In one or more implementations, the AFEs and DFE 270 may be on the same integrated chip. Alternatively, the AFEs may be on a different integrated chip from the DFE 270.

The DFE 270 includes the eUSB bridge 275, the transmitter UTMI 280, and the receiver UTMI 285. The eUSB bridge 275 may facilitate communication between the AFEs and one of the transmitter UTMI 280 and the receiver UTMI 285, based on whether eUSB2 or USB 2.0 signals are being transmitted from or received by the AFEs. The transmitter UTMI 280 and the receiver UTMI 285 are communicably connected with a controller (not shown), such as a USB 2.0 controller.

Figure 11B:
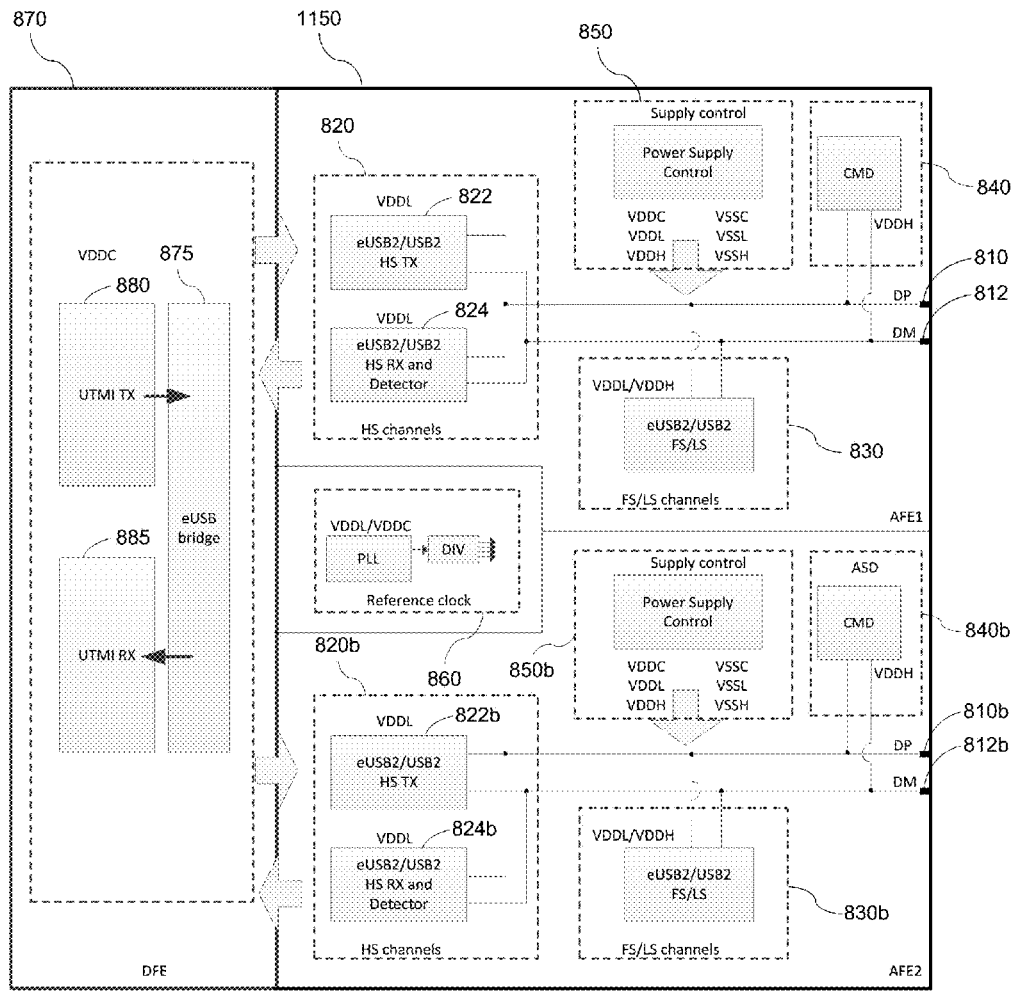

FIG. 11B illustrates an example of an integrated chip or portion thereof, hereafter referred to as an integrated chip 1150, that includes multiple ports, where each port facilitates communication via USB 2.0 and eUSB2, in accordance with one or more implementations of the subject disclosure. With multi-port configurations operating in parallel, multiple eUSB2 communication, multiple USB 2.0 communication, and/or a combination of eUSB2 communication and USB 2.0 communication may operate simultaneously on the integrated chip 1150.

In one or more implementations, a first port of the integrated chip 1150 may be associated with the components illustrated in the integrated chip 800 of FIG. 8A. A second port may be associated with components corresponding to those of the first port of the integrated chip 1150, including a first data line 810b, a second data line 812b, a HS circuitry 820b, an FS/LS circuitry 830b, a communication-mode determination circuitry 840b, and a power supply control circuitry 850b. The reference clock circuitry 860 may be shared between the first port and the second port.

In one or more implementations, each of the ports of the integrated chip 1150 may be associated with a respective AFE of a USB 2.0 and eUSB2 compliant device. The AFEs may be in communication with a DFE 870, with the DFE 870 shared by the AFEs. In one or more implementations, the AFEs and DFE 870 may be on the same integrated chip. Alternatively, the AFEs may be on different integrated chips from the DFE 870.

The DFE 870 includes the eUSB bridge 875, the transmitter UTMI 880, and the receiver UTMI 885. The eUSB bridge 875 may facilitate communication between the AFEs and one of the transmitter UTMI 880 and the receiver UTMI 885, based on whether eUSB2 or USB 2.0 signals are being transmitted from or received by the AFEs. The transmitter UTMI 880 and the receiver UTMI 885 are communicably connected with a controller (not shown), such as a USB 2.0 controller.

The subject disclosure provides a single integrated chip that facilitates communication via USB 2.0 and eUSB2. In one or more implementations, the single integrated chip may allow support for both short cable and inter-chip applications without any external component. Implementation of USB 2.0 and eUSB2 on the single integrated chip may allow for a reduction in area cost and power overhead compared to separate integrated chips for USB 2.0 and eUSB2. The single integrated chip may allow for switching between the USB 2.0 and eUSB2 communications based on a connecting component (e.g., a connecting chip or connecting device) that may be connected to the single integrated chip. Although USB 2.0 communications are discussed herein, the single integrated chip may also be utilized with USB 1.x communications.

The single integrated chip may be utilized in any device to facilitate communication via USB 2.0 and eUSB2. Such devices may include a desktop computer, a laptop computer, a tablet computer, a handheld computer, a PDA, a cellular telephone, a network appliance, a camera, a smart phone, a EGPRS mobile phone, a media player, a navigation device, an email device, a game console, or a combination of any of these data processing devices or other data processing devices.

In some aspects, I/O power efficiency and process scalability may be improved. For devices with multi-port configurations, both eUSB2 and USB 2.0 standards can operate simultaneously on a single chip. Implementing both eUSB2 and USB 2.0 standards on a single integrated chip may allow for more flexibility to select between the two standards based on application.

The subject disclosure may be utilized in connection with "Universal Serial Bus Specification, Revision 2.0", Apr. 27, 2000, and "Embedded USB2 (eUSB2) Physical Layer Supplement to the USB Revision 2.0 Specification", Aug. 1, 2014, both of which are incorporated herein by reference in their entireties.

In the semiconductor industry environment of foundries and fabless companies, it is the foundries that develop, specify and provide the physical structures that designers use to implement their designs. Foundries provide manufacturing services to many fabless semiconductor companies, but to operate profitably, manufacturing processes are optimized to achieve high yields. Such optimizations typically require that limitations be placed on the variety of structures that can be produced by a particular manufacturing process. Consistent with the foregoing, foundries typically provide a limited set of transistor structures that are intended to cover a broad range of circuit applications.

One or more implementations are performed by one or more integrated circuits, such as application specific integrated circuits (ASICs) or field programmable gate arrays (FPGAs). In one or more implementations, such integrated circuits execute instructions that are stored on the circuit itself. The term "integrated circuit" or "semiconductor device" may include, but is not limited to, a design tool output file as binary code encompassing the overall physical design of the integrated circuit or semiconductor device, a data file encoded with code representing the overall physical design of the integrated circuit or semiconductor device, a packaged integrated circuit or semiconductor device, or an unpackaged die. The data file can include elements of the integrated circuit or semiconductor device, interconnections of those elements, and timing characteristics of those elements (including parasitics of the elements).

The various illustrative blocks, elements, components, and methods described herein may be implemented as electronic hardware. Various illustrative blocks, elements, components, and methods have been described above generally in terms of their functionality. Whether such functionality is implemented as hardware depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The predicate words "configured to" and "operable to" do not imply any particular tangible or intangible modification of a subject, but, rather, are intended to be used interchangeably. In one or more implementations, a receiver configured to receive and process an operation or a component may also mean the receiver being operable to receive and process the operation.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used in this specification and any claims of this application, the terms "amplifier", "transceiver", "transmitter", "receiver", and "circuitry", all refer to electronic or other technological devices. These terms exclude people or groups of people.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An integrated circuit, comprising:
    a communication-mode determination circuitry configured to detect a signal level at one or both of a first data line and a second data line, the communication-mode determination circuitry configured to determine whether a communication mode of the first data line and the second data line is a first universal serial bus (USB) communication mode or a second USB communication mode;
    a first transceiver circuitry configured to operate in one of a first plurality of modes, based on the communication mode determined; and
    a second transceiver circuitry configured to operate in one of a second plurality of modes, based on the communication mode determined, wherein at least one of the second plurality of modes is associated with a higher maximum signal level than each of the first plurality of modes,
    wherein a maximum signal level of the first USB communication mode is greater than a maximum signal level of the second USB communication mode, and wherein the second plurality of modes comprises a second speed mode of the first USB communication mode and a third speed mode of the first USB communication mode.

2. The integrated circuit of claim 1,
    wherein the first plurality of modes comprises a first speed mode of the first USB communication mode and a first speed mode of the second USB communication mode.

3. The integrated circuit of claim 2, wherein the first plurality of modes further comprises a second speed mode of the second USB communication mode and a third speed mode of the second USB communication mode.

4. The integrated circuit of claim 1,
    wherein a first predetermined threshold voltage is less than the maximum signal level of the first USB communication mode,
    wherein the first predetermined threshold voltage is greater than the maximum signal level of the second USB communication mode,
    wherein when the detected signal level is greater than the first predetermined threshold voltage, the communication-mode determination circuitry is configured to determine that the communication mode of the first data line and the second data line is the first USB communication mode, and wherein when the detected signal level is less than the first predetermined threshold voltage, the communication-mode determination circuitry is configured to determine that the communication mode of the first data line and the second data line is the second USB communication mode.

5. The integrated circuit of claim 1, wherein the first transceiver circuitry comprises a voltage protection circuitry configured to protect circuitry in the first transceiver circuitry from a voltage level associated with the second transceiver circuitry.

6. The integrated circuit of claim 5, wherein the voltage protection circuitry is coupled to the first data line and the second data line.

7. The integrated circuit of claim 5, wherein the first transceiver circuitry comprises:
a first driver circuitry associated with a first speed mode of the first USB communication mode and a first speed mode of the second USB communication mode, and
a second driver circuitry associated with a second speed mode of the second USB communication mode and a third speed mode of the second USB communication mode,
wherein the voltage protection circuitry is coupled to the first driver circuitry and the second driver circuitry.

8. The integrated circuit of claim 7, wherein the first driver circuitry is configured to transmit at least two signals, the first transceiver circuitry further comprising:
a first transistor configured to receive one of the at least two signals, and
a second transistor configured to receive one of the at least two signals,
wherein the first transistor and the second transistor are coupled to the voltage protection circuitry.

9. The integrated circuit of claim 5, wherein the voltage protection circuitry comprises at least one laterally diffused metal-oxide semiconductor transistor.

10. The integrated circuit of claim 1, wherein the first USB communication mode is a USB 2.0 communication mode, and the second USB communication mode is an embedded USB2 communication mode.

11. The integrated circuit of claim 1, wherein the integrated circuit is configured to establish a connection with a connecting component, the integrated circuit configured to determine a speed mode associated with the connecting component based at least on the connection.

12. An integrated circuit, comprising:
a communication-mode determination circuitry configured to detect a signal level at one or both of a first data line and a second data line, the communication-mode determination circuitry configured to determine a communication mode of the first data line and the second data line, wherein the communication mode is one of a first universal serial bus (USB) communication mode or a second USB communication mode;
a first shared transceiver circuitry configured to operate in one of a first plurality of modes of the first USB communication mode or the second USB communication mode, based on the communication mode determined;
a second shared transceiver circuitry configured to operate in one of a second plurality of modes of the first USB communication mode, based on the communication mode determined; and a voltage protection circuitry configured to protect circuitry in the first shared transceiver circuitry from a voltage level associated with the second shared transceiver circuitry, wherein a maximum signal level of the first USB communication mode is greater than a maximum signal level of the second USB communication mode.

13. The integrated circuit of claim 12,
wherein the first plurality of modes comprises a first speed mode of the first USB communication mode, a first speed mode of the second USB communication mode, a second speed mode of the second USB communication mode, and a third speed mode of the second USB communication mode, and
wherein the second plurality of modes comprises a second speed mode of the first USB communication mode and a third speed mode of the first USB communication mode.

14. The integrated circuit of claim 12,
wherein a first predetermined threshold voltage is less than the maximum signal level of the first USB communication mode,
wherein the first predetermined threshold voltage is greater than the maximum signal level of the second USB communication mode,
wherein when the detected signal level is greater than the first predetermined threshold voltage, the communication-mode determination circuitry is configured to determine that the communication mode of the first data line and the second data line is the first USB communication mode, and
wherein when the detected signal level is less than the first predetermined threshold voltage, the communication-mode determination circuitry is configured to determine that the communication mode of the first data line and the second data line is the second USB communication mode.

15. The integrated circuit of claim 12, wherein the first shared transceiver circuitry comprises a variable resistance termination, a resistance of the variable resistance termination being based on whether the communication mode is the first USB communication mode or the second USB communication mode and whether a speed mode is a first speed mode, second speed mode, or third speed mode.

16. The integrated circuit of claim 12, wherein the first shared transceiver circuitry comprises:
a first driver circuitry associated with a first speed mode of the first USB communication mode and a first speed mode of the second USB communication mode, and
a second driver circuitry associated with a second speed mode of the second USB communication mode and a third speed mode of the second USB communication mode,
wherein the voltage protection circuitry is coupled to the first driver circuitry, the second driver circuitry, the first data line, and the second data line.

17. An integrated circuit, comprising:
a first data line;
a second data line;
a communication-mode determination circuitry configured to detect a signal level at one or both of the first data line and the second data line, the communication-mode determination circuitry configured to determine whether a communication mode of the first data line and the second data line is a first universal serial bus (USB) communication mode or a second USB communication mode;

a first shared transceiver circuitry configured to operate in one of a first speed mode of the first USB communication mode or a first speed mode of the second USB communication mode, based on the communication mode determined;

a second shared transceiver circuitry configured to operate in one of a second speed mode of the first USB communication mode or a third speed mode of the first USB communication mode, based on the communication mode determined; and a third shared transceiver circuitry configured to operate in one of a second speed mode of the second USB communication mode or a third speed mode of the second USB communication mode, based on the communication mode determined, wherein a maximum signal level of the first USB communication mode is greater than a maximum signal level of the second USB communication mode.

18. The integrated circuit of claim 17, wherein a first predetermined threshold voltage is less than the maximum signal level of the first USB communication mode, wherein the first predetermined threshold voltage is greater than the maximum signal level of the second USB communication mode, wherein when the detected signal level is greater than the first predetermined threshold voltage, the communication-mode determination circuitry is configured to determine that the communication mode of the first data line and the second data line is the first USB communication mode, and wherein when the detected signal level is less than the first predetermined threshold voltage, the communication-mode determination circuitry is configured to determine that the communication mode of the first data line and the second data line is the second USB communication mode.

19. The integrated circuit of claim 17, further comprising:

a power supply control circuitry configured to provide a first supply voltage and a second supply voltage, wherein a voltage level of the first supply voltage is greater than a voltage level of the second supply voltage, wherein the second shared transceiver circuitry is configured to receive the first supply voltage, and wherein the third shared transceiver circuitry is configured to receive the second supply voltage.

20. The integrated circuit of claim 17, wherein:

the first shared transceiver circuitry comprises the third shared transceiver circuitry, and the first shared transceiver circuitry comprises a voltage protection circuitry configured to protect circuitry in the first shared transceiver circuitry from a voltage level associated with the second shared transceiver circuitry.

* * * * *